(12) United States Patent
Yamamoto et al.

(10) Patent No.: US 9,774,039 B2
(45) Date of Patent: Sep. 26, 2017

(54) NEGATIVE ELECTRODE MATERIAL FOR ELECTRIC STORAGE DEVICE, NEGATIVE ELECTRODE FOR ELECTRIC STORAGE DEVICE, ELECTRIC STORAGE DEVICE, AND VEHICLE

(71) Applicant: KABUSHIKI KAISHA TOYOTA JIDOSHOKKI, Kariya-shi, Aichi (JP)

(72) Inventors: Megumi Yamamoto, Kariya (JP); Manabu Miyoshi, Kariya (JP); Hideaki Shinoda, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 556 days.

(21) Appl. No.: 14/351,605

(22) PCT Filed: Oct. 5, 2012

(86) PCT No.: PCT/JP2012/006422
§ 371 (c)(1),
(2) Date: Apr. 14, 2014

(87) PCT Pub. No.: WO2013/054500
PCT Pub. Date: Apr. 18, 2013

(65) Prior Publication Data
US 2014/0234705 A1 Aug. 21, 2014

(30) Foreign Application Priority Data
Oct. 14, 2011 (JP) ................................. 2011-226885

(51) Int. Cl.
*H01M 4/48* (2010.01)
*H01M 4/62* (2006.01)
(Continued)

(52) U.S. Cl.
CPC ............. *H01M 4/625* (2013.01); *H01M 4/13* (2013.01); *H01M 4/364* (2013.01); *H01M 4/48* (2013.01);
(Continued)

(58) Field of Classification Search
CPC ......... H01M 10/0525; H01M 10/0569; H01M 4/13; H01M 4/364; H01M 4/48
(Continued)

(56) References Cited

U.S. PATENT DOCUMENTS

2008/0268338 A1* 10/2008 Lee ......................... H01M 4/06
429/218.1
2010/0055563 A1* 3/2010 Nakanishi ............. H01M 4/364
429/209

(Continued)

FOREIGN PATENT DOCUMENTS

| JP | 2004-319170 A | 11/2004 |
|---|---|---|
| JP | 2007-103066 A | 4/2007 |

(Continued)

*Primary Examiner* — Jonathan Jelsma
*Assistant Examiner* — Rashid Alam
(74) *Attorney, Agent, or Firm* — Sughrue Mion, PLLC

(57) ABSTRACT

It is an assignment to provide the following: a negative-electrode material for electric storage device, a negative electrode for electric storage device, and an electric storage device, negative-electrode material, negative electrode and electric storage device in which $SiO_x$ is used as a negative-electrode active material, which excel in the conductivity, and which can inhibit the discharge capacity from declining; as well as a vehicle having the electric storage device on-board. In the negative-electrode material for electric storage device, acetylene black is used as a conductive additive; and, when a sum of contents of $SiO_x$, graphite, conductive additive and a binder resin is taken as 100% by mass, the contents are made so as to be as follows: a content of a negative-electrode active material including the $SiO_x$ (Continued)

and graphite is 70% by mass or more; the content of the $SiO_x$ is from 17% by mass or more and 40% by mass or less; a sum of the contents of the conductive additive and binder resin is from 8% by mass or more to 20% by mass or less; and the content of the conductive additive is from 6% by mass or more to 12% by mass or less.

19 Claims, 7 Drawing Sheets

(51) Int. Cl.
*H01M 4/13* (2010.01)
*H01M 4/505* (2010.01)
*H01M 4/525* (2010.01)
*H01M 4/36* (2006.01)
*H01M 4/587* (2010.01)
*H01M 10/0569* (2010.01)
*H01M 10/0525* (2010.01)

(52) U.S. Cl.
CPC ........... *H01M 4/483* (2013.01); *H01M 4/505* (2013.01); *H01M 4/525* (2013.01); *H01M 4/587* (2013.01); *H01M 10/0525* (2013.01); *H01M 10/0569* (2013.01); *Y02E 60/122* (2013.01)

(58) Field of Classification Search
USPC .......................................... 429/200
See application file for complete search history.

(56) References Cited

U.S. PATENT DOCUMENTS

| 2011/0262796 A1* | 10/2011 | Shimooka | H01M 2/1653 |
| | | | 429/144 |
| 2012/0321948 A1* | 12/2012 | Oya | H01M 4/0404 |
| | | | 429/211 |

FOREIGN PATENT DOCUMENTS

| JP | 2007-109423 A | 4/2007 |
| JP | 2010-212228 A | 9/2010 |
| JP | 2011-60520 A | 3/2011 |
| WO | 2010/016475 A1 | 2/2010 |
| WO | WO 2011105126 A1 * | 9/2011 |

* cited by examiner

NEGATIVE ELECTRODE MATERIAL FOR ELECTRIC STORAGE DEVICE, NEGATIVE ELECTRODE FOR ELECTRIC STORAGE DEVICE, ELECTRIC STORAGE DEVICE, AND VEHICLE

CROSS REFERENCE TO RELATED APPLICATIONS

This application is a National Stage of International Application No. PCT/JP2012/006422 filed Oct. 5, 2012, claiming priority based on Japanese Patent Application No. 2011-226885 filed Oct. 14, 2011, the contents of all of which are incorporated herein by reference in their entirety.

TECHNICAL FIELD

The present invention is one which relates to a material for negative electrode being employable in electric storage devices, a negative electrode using the negative-electrode material, and an electric storage device using the negative electrode; as well as a vehicle using the electric storage device.

BACKGROUND ART

A variety of electric devices have been employed recently. As a kind of the electric devices, lithium-ion secondary batteries have been known. Since the lithium-ion secondary batteries have small sizes and large capacities, they have been used widely as a secondary battery for cellular phones, notebook-size personal computers, and so on. In recent years, their use as a battery for electric automobiles, hybrid automobiles, and so forth, has also been proposed.

Lithium-ion secondary batteries possess an active material, which can insert and eliminate lithium (Li), in the positive electrode and negative electrode, respectively. Lithium-ion secondary batteries operate by means of the movements of lithium ions between the two electrodes.

As a negative-electrode active material for lithium-ion secondary battery, carbon materials having a multilayer structure have been used mainly. Using this sort of carbon material leads to making it possible to inhibit the decline of discharge capacity after being charged and discharged repetitively, thereby making the cyclability of lithium-ion secondary batteries upgradable. However, lithium-ion secondary batteries, whose negative-electrode active material is constituted of these carbon materials alone, are associated with such a problem that they are poor in terms of the initial capacity (or energy density).

In order to enhance the initial capacity of lithium-ion secondary batteries, it has been proposed to use elements, which can be alloyed with Li and whose theoretical capacity is larger than that of carbon materials, as a negative-electrode active material. Since silicon (Si), an element being capable of alloying with Li, has a larger theoretical capacity than do carbon materials and the other elements (e.g., tin and germanium), it has been believed that Si is useful as a negative-electrode active material for use in lithium-ion secondary batteries. That is, compared with using carbon materials, using Si as a negative-electrode active material makes it possible to obtain higher-capacity lithium-ion secondary batteries.

In the meanwhile, Si undergoes volumetric changes greatly, being accompanied by the occlusion and release (or sorption and desorption), and vice versa, of Li at the time of charging and discharging. The volumetric changes turn Si into fine particles to fall down or come off from current collectors, so that there is such a problematic issue that the charging-discharging cyclic longevity of the resulting batteries is shorter. Hence, compared with the case where Si is used as a negative-electrode active material, using silicon oxide as a negative-electrode active material results in making it more possible to inhibit the volumetric changes that are accompanied by the sorption and desorption, and vice versa, of Li at the time of charging and discharging.

For example, it has been investigated to employ a silicon oxide (i.e., $SiO_x$ where "x" is $0.5 \leq$"x"$\leq 1.5$ approximately) as a negative-electrode active material. "$SiO_x$" is a general formula expressing the generic term for amorphous silicon oxide that is obtainable from metallic silicon (Si) and silicon dioxide ($SiO_2$) serving as the raw materials. It has been known that $SiO_x$ decomposes into silicon (Si) and silicon dioxide ($SiO_2$) when being heat treated. This is referred to as a "disproportionation reaction." When the silicon oxide is homogeneous solid silicon monoxide (SiO) in which the ratio between Si and O is 1:1 roughly, the silicon oxide separates into two phases, a silicon (Si) phase and a silicon dioxide ($SiO_2$) phase, by means of the internal reactions in the solid. The Si phase, which is obtainable as an outcome of the separation is fine extremely, so that it is dispersed within the $SiO_2$ phase. Moreover, the $SiO_2$ phase covering the Si phase possesses an action of inhibiting electrolytic solutions from decomposing. Therefore, lithium-ion secondary batteries, in which a negative-electrode active material comprising $SiO_x$ that has been decomposed into Si and $SiO_2$ is used, excel in the cyclability.

Incidentally, $SiO_x$ is poor in terms of the conductivity comparatively. Consequently, negative electrodes including $SiO_x$ as the negative-electrode active material are also poor in terms of the conductivity. Therefore, it has been desired to upgrade the conductivity of the negative electrodes including $SiO_x$. In order to upgrade the conductivity of the negative electrodes, it is believed to be good to blend a material excelling in the conductivity, namely, a conductive additive, into negative electrodes. Moreover, the particle diameter of conductive additive is usually smaller than the particle diameter of $SiO_x$. Consequently, the resulting negative-electrode active material's surface can be covered with a conductive additive by blending the conductive additive more into the negative-electrode active material. Because conductive additives have a function of retaining electrolytic solutions as well, the electrolytic solutions become widespread fully at around the surface of the negative-electrode active material. Consequently, it is believed that the discharge capacity of the resultant lithium-ion secondary batteries upgrades.

Since KETJENBLACK (or KB) having been used generally as a conductive additive is carbonaceous fine particles, it excels in the conductivity. In the meantime, however, because KB has a hollow configuration so that the specific surface area is large, it has such a problem that it is likely to agglomerate. When a conductive additive has been agglomerated, it is less likely to disperse the conductive additive uniformly within the resulting negative-electrode active material, so that it is less likely to upgrade the resultant conductivity fully. It is believed that, when using a conductive additive whose specific surface area is smaller than that of KB, it is believed possible to circumvent the drawback resulting from the agglomeration of the conductive additive.

For example, in Patent Literature No. 1, a technique is disclosed in which acetylene black (or AB) serving as a conductive additive is blended into a negative-electrode active material for lithium-ion secondary battery in which SiO$_x$ serves as a negative-electrode active material. However, blending AB simply into a negative-electrode active material might possibly give rise to a case where it is less likely to upgrade the battery characteristics of the resulting lithium-ion secondary battery. For example, when a conductive additive has been blended into a negative-electrode active material excessively in order to intend to upgrade the resultant conductivity, the rate of adhesion between the conductive additive and SiO$_x$ has declined because the surface area of the conductive additive has become enormous, so that there might possibly arise such a case where the resulting discharge capacity declines. Moreover, in such an instance, the amount of SiO$_x$ has declined with respect to that of the conductive additive. On account of this as well, there might possibly arise such a case where the resultant discharge capacity declines. Thus, current electric storage devices being represented by lithium-ion secondary batteries have not yet arrived at satisfying a variety of characteristics to be required. Therefore, it has been desired to develop electric storage devices that excel in various characteristics (being hereinafter called "battery characteristics") as an electric storage device.

RELATED TECHNICAL LITERATURE

Patent Literature

Patent Literature No. 1: Japanese Unexamined Patent Publication (KOKAI) Gazette No. 2011-060520

SUMMARY OF THE INVENTION

Assignment to be Solved by the Invention

The present invention is one which has been done in view of the circumstances being aforementioned. It therefore aims at providing a negative-electrode material for electric storage device, a negative electrode for electric storage device, and an electric storage device, the negative-electrode material, negative electrode and electric storage device including SiO$_x$ as a negative-electrode active material, and excelling in battery characteristics.

Means for Solving the Assignment

In a negative electrode in which the negative-electrode active material comprises SiO$_x$ alone, the volumetric changes at the time of charging and discharging are great comparatively. The inventors of the present invention assumed as a result of their earnest studies that conductive paths, which are formed within the negative electrode, are cut off upon the contractions of SiO$_x$ and thereby the conductivity of the negative electrode deteriorates. It is believed that at least a part of the conductive paths are formed of a conductive additive that is put in place on the surface of SiO$_x$. Consequently, it is believed that the more a conductive additive is blended into the resulting negative electrode the more conductive paths are formed and thereby the resultant conductive paths are less likely to be cut off even upon the contractions of SiO$_x$. Moreover, the inventors of the present invention assumed that voids or spaces (i.e., micro spaces, and macro spaces) within a negative electrode affect the conductivity of the negative electrode, the discharge capacity of electric storage device, and the discharge-capacity declines therein. And, the inventors of the present invention did much more earnest studies repeatedly to find out that the types and contents of conductive additives have influences on the spaces (i.e., micro spaces, and macro spaces) that are formed within negative electrodes.

That is, a negative-electrode material for electric storage device according to the present invention is characterized in that:

the negative-electrode material for electric storage device is a negative-electrode material comprising:
  a negative-electrode active material including a silicon oxide, which is expressed by SiO$_x$ (where $0.3 \leq "x" \leq 1.6$), and graphite;
  a conductive additive containing carbonaceous fine particles; and
  a binder resin;
  the conductive additive is acetylene black;
  a content of the negative-electrode active material is 70% by mass or more;
  a content of the SiO$_x$ is from 17% by mass or more to 40% by mass or less;
  a sum of a content of the conductive additive and a content of the binder resin is from 8% by mass or more to 20% by mass or less; and
  a content of the conductive additive is from 6% by mass or more to 12% by mass or less;
  when a sum of the contents of the SiO$_x$, the graphite, the conductive additive and the binder resin is taken as 100% by mass.

Moreover, a negative electrode for electric storage device according to the present invention that solves the aforementioned assignment is characterized in that the negative electrode comprises the above-described negative-electrode material for electric storage device that serves as one of the materials.

In addition, an electric storage device according to the present invention that solves the aforementioned assignment is characterized in that the electric storage device comprises the above-described negative electrode for electric storage device.

Hereinafter, the negative-electrode material for electric storage device according to the present will be simply abbreviated to as a "negative-electrode material" unless being explained otherwise especially. Moreover, the negative electrode for electric storage device according to the present invention will be simply abbreviated to as a "negative electrode."

Effect of the Invention

Regardless of using SiO$_x$ as a part of the negative-electrode active material, the negative-electrode material and negative electrode according to the present invention are capable of upgrading battery characteristics of the resulting electric storage devices. Moreover, regardless of using SiO$_x$ as a part of the negative-electrode active material, the electric storage device according to the present invention excels in the battery characteristics.

Figure 4:
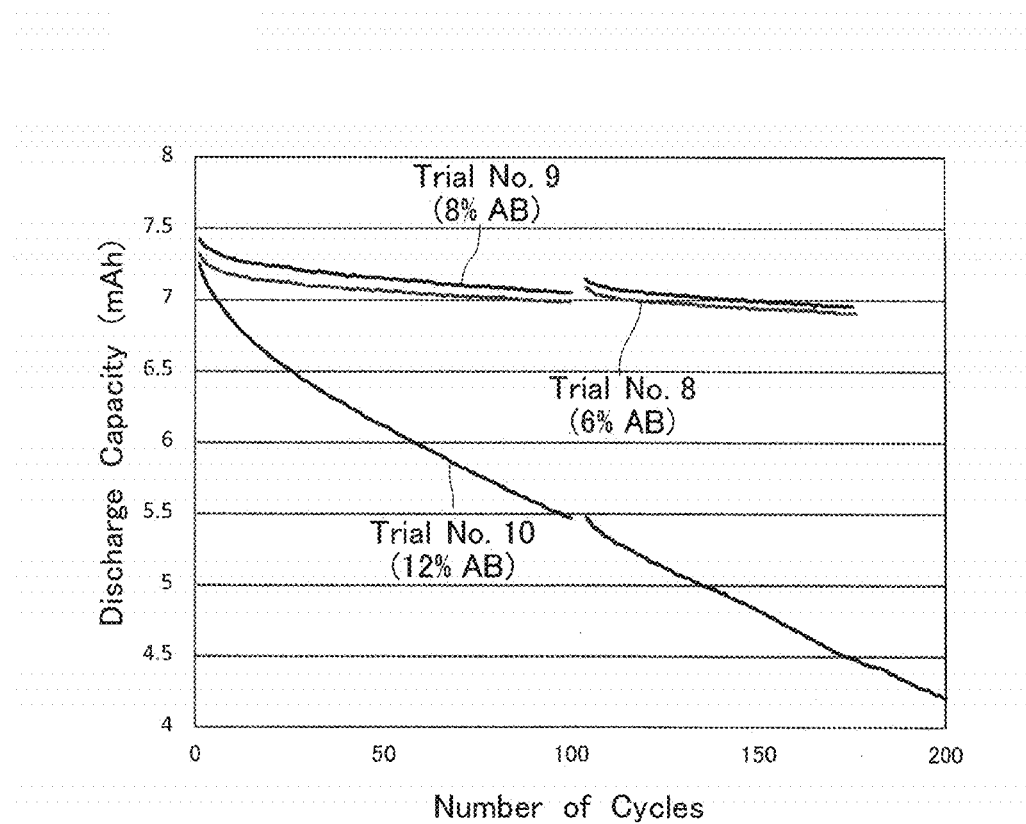
Figure 5:
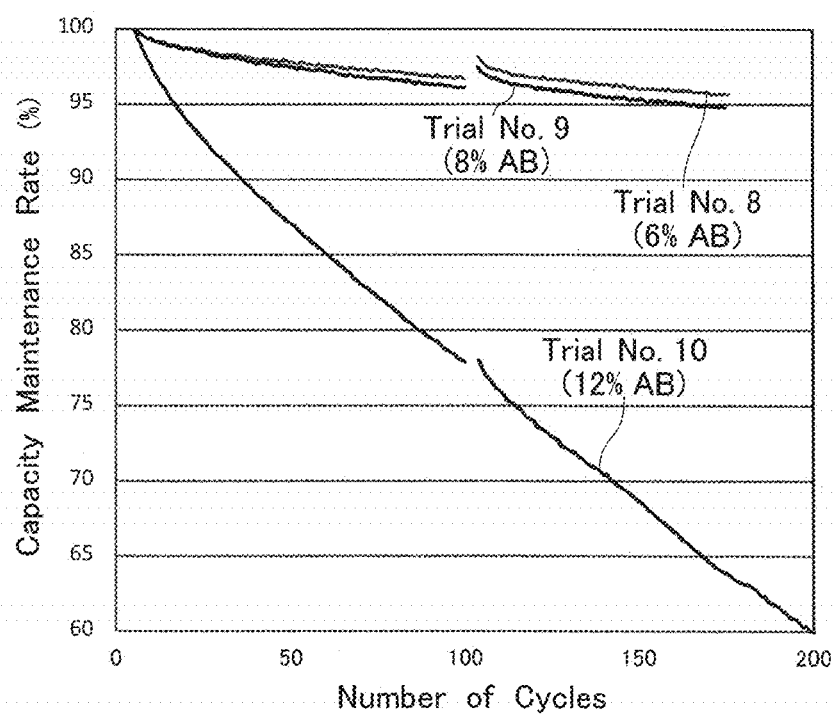
Figure 6:
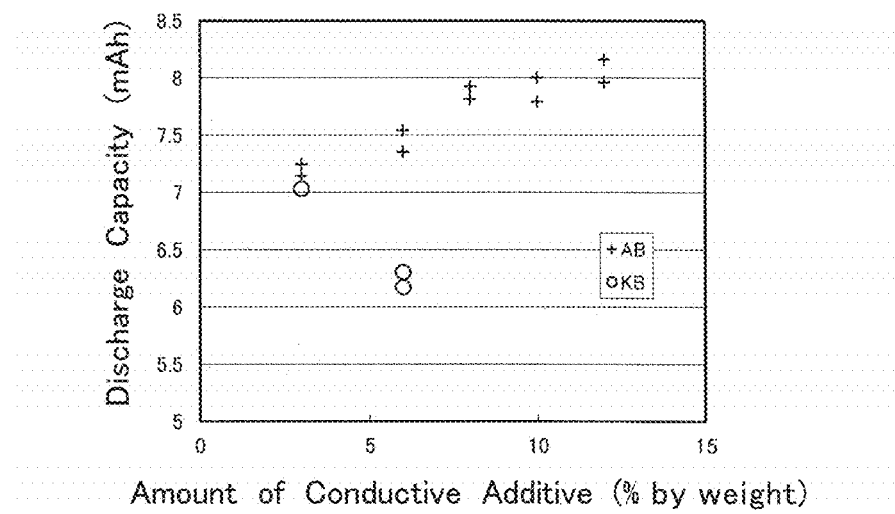
Figure 7:
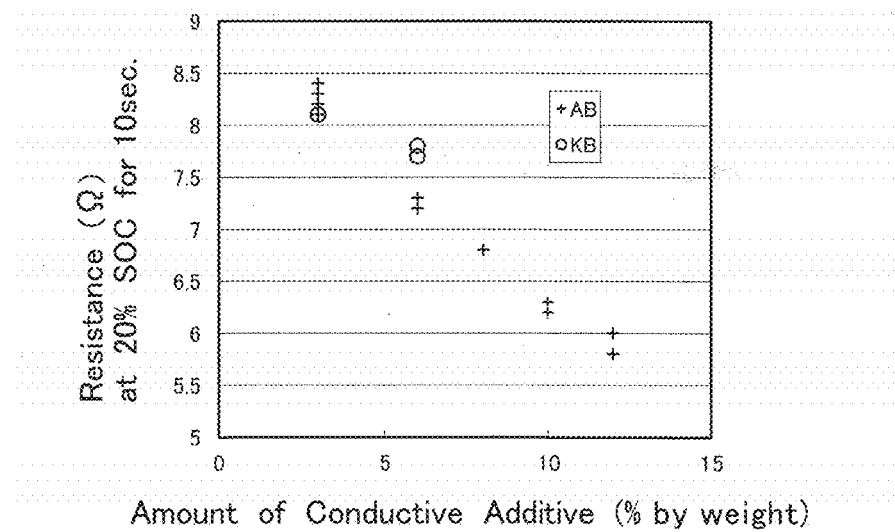
Figure 8:
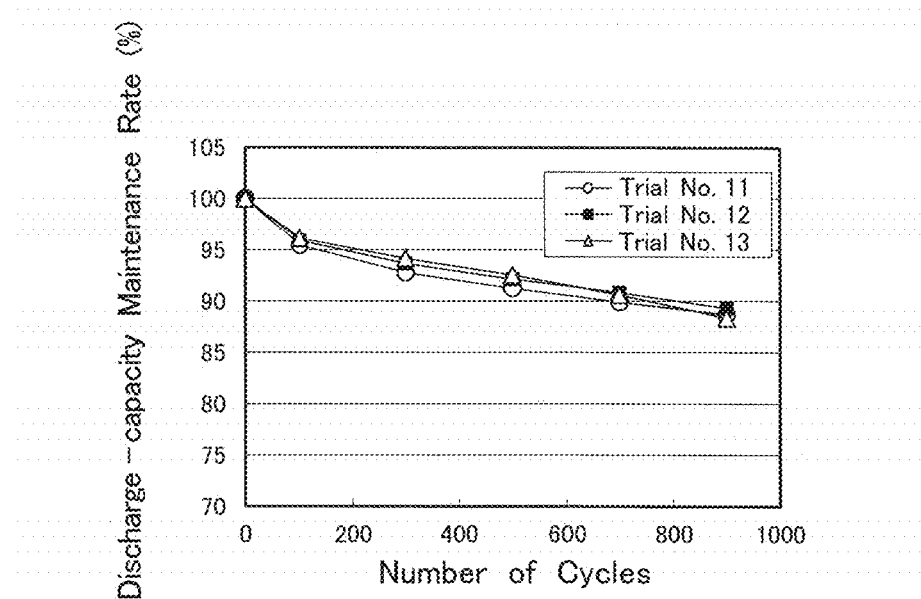
Figure 9:
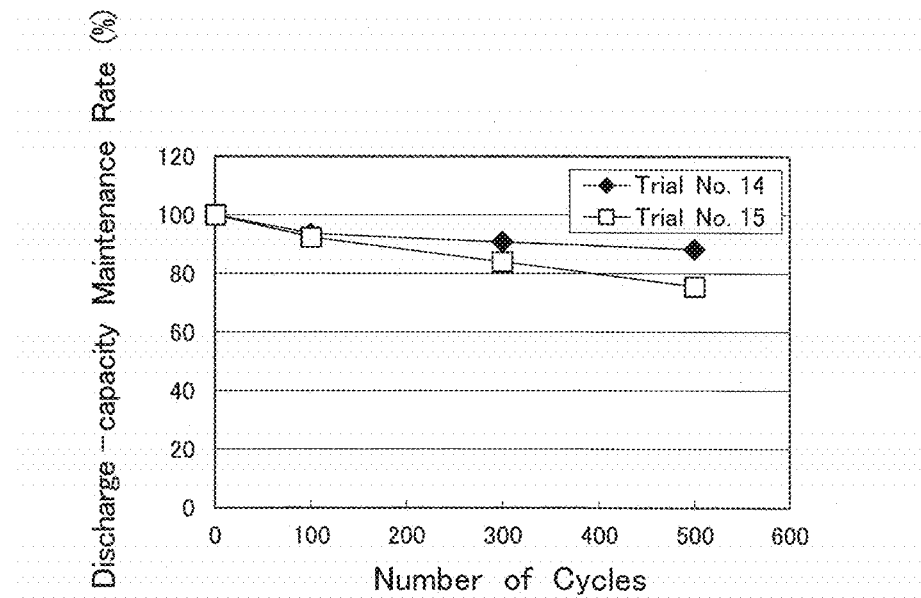

FIG. 4 is a graph that shows the cyclability of lithium-ion secondary batteries according to Trial Nos. 8 through 10, respectively, and the vertical axis specifies the discharge capacities thereof;

FIG. 5 is a graph that shows the cyclability of the lithium-ion secondary batteries according to Trial Nos. 8 through 10, respectively, and the vertical axis specifies the discharge-capacity maintenance rates thereof;

FIG. 6 is a graph that shows the initial discharge capacity of the lithium-ion secondary batteries according to Trial Nos. 1 through 10, respectively, and the vertical axis specifies the discharge capacities thereof;

FIG. 7 is a graph that shows the discharge IR drop of the lithium-ion secondary batteries according to Trial Nos. 1 through 10, respectively;

FIG. 8 is a graph that shows the cyclability of electric storage devices according to Trial No. 11 through Trial No. 13, respectively; and FIG. 9 is a graph that shows the cyclability of electric storage devices according to Trial No. 14 and Trial No. 15, respectively.

MODES FOR CARRYING OUT THE INVENTION

As described above, regardless of using $SiO_x$ (i.e., a silicon oxide) as a part of the negative-electrode active material, the negative-electrode material and negative electrode according to the present invention are capable of upgrading battery characteristics of the resulting electric storage devices. To be more concrete, the negative-electrode material and negative electrode according to the present invention excel in the conductivity, and can inhibit declines in the discharge capacity of the resultant electric storage devices. The following are believed to be reasons that these can be brought about.

When the content of a conductive additive is less in a negative-electrode material, comparatively large voids or spaces (being hereinafter called "macro spaces") are formed within the negative electrode. When the macro spaces are present excessively, it is less likely to upgrade the strength of the negative electrode, so that there is such a possibility that cracks, and so on, occur in the negative electrode. Therefore, when the content of a conductive additive is made greater, the macro spaces can be reduced and accordingly it is believed feasible to upgrade the strength of the negative electrode. Moreover, when the content of a conductive additive is made greater, fine voids or spaces (being hereinafter called "micro spaces") are formed abundantly within the negative electrode. This is because of the micro spaces that are formed mutually between fine conductive-additive constituent elements. Since an electrolytic solution is retained in those micro spaces, it is believed that the electrolytic solution becomes widespread fully at around the surface of the resulting negative-electrode active material. Moreover, it is even possible to believe that conductive paths can also be formed fully, because the conductive additive is put in place abundantly at around the surface of $SiO_x$. Consequently, it is believed that making the blended amount of a conductive additive greater to form the micro spaces abundantly leads to upgrading the conductivity and discharge capacity of the resultant electric storage devices (or lithium-ion secondary batteries, for instance).

Moreover, since AB has a smaller specific surface area and a larger specific gravity than does KB, it is possible to make the blended amount (or mass) of AB into a negative electrode greater, compared with that of KB. Consequently, it is believed that using AB serving as a conductive additive results in making it possible to reduce the macro spaces within the resulting negative electrode, and results in making it possible to form the micro spaces abundantly within the resultant negative electrode.

In addition, it is believed that setting the content of AB in the present negative-electrode material and negative electrode at a predetermined amount or less leads to inhibiting the above-described excessive supply of an electrolytic solution into $SiO_x$, and to making it possible to inhibit the electrolytic solution and $SiO_x$ from deteriorating.

Moreover, the negative-electrode material according to the present invention comprises $SiO_x$, graphite, a conductive additive, and a binder resin. Of these constituent elements, the $SiO_x$ and graphite constitute a negative-electrode active material in the negative-electrode material according to the present invention.

As described above, the SiO is made up of SiO (where $0.3 \leq "x" \leq 1.6$) that has been decomposed into fine Si, and $SiO_2$, which covers the fine Si, by means of the disproportionation reaction. When the value "x" is less than the lower-limit value, since the Si ratio becomes higher, the volumetric changes have become too great at the time of charging and discharging so that the resulting cyclability has declined. Moreover, when the value "x" exceeds the upper-limit value, the Si ratio declines so that the resultant energy density has come to decline. In light of the above, it is preferable that a range of the value "x" can be $0.5 \leq "x" \leq 1.5$, and it is more desirable that the range can be $0.7 \leq "x" \leq 1.2$.

In general, it has been said that, as far as being in a state of being cut off from oxygen, almost all of SiO disproportionate to separate into the two phases at 800° C. or more. To be concrete, an SiO powder including the two layers of an amorphous $SiO_2$ phase and a crystalline Si phase is obtainable by carrying out, with respect to a raw-material silicon-oxide powder including an amorphous SiO powder, a heat treatment at from 800 to 1,200° C. for from one to five hours in an inert atmosphere, such as in a vacuum or in an inert gas.

It is preferable that the SiO can have a particulate shape, but its particle diameters do not matter at all especially. Moreover, it is allowable that the SiO can also be primary particles, or it is permissible that it can even be secondary particles. In addition, it is desirable that the $SiO_x$ can exhibit an average particle diameter falling in a range of from 1 µm to 10 µm. When the average particle diameter is larger than 10 µm, there might possibly arise a case where the charging and discharging characteristics of the resulting electric storage devices decline. Moreover, when the average particle diameter is smaller than 1 µm, there might possibly arise the case likewise where the charging and discharging characteristics of the resultant electric storage devices decline, because there might possibly arise a case where the $SiO_x$ agglomerates to turn into coarse particles upon manufacturing electrodes. Note that the "average particle diameter" being referred to herein designates a mass average particle diameter in a grain-size distribution measurement by means of laser-light diffraction method. In addition, taking the cyclability of the resulting electric storage devices into consideration, it is preferable that a "$D_{50}$" of the $SiO_x$ can be 5.7 µm or more, and it is more preferable that the "$D_{50}$" can be 6.4 µm or more. This is because the $SiO_x$ with small particle diameters is likely to break down. Taking the cyclability of the resultant electric storage devices and the charging and discharging characteristics being described above into consideration, it is preferable that the "$D_{50}$" of the $SiO_x$ can be from 5.7 μm or more to 7.8 μm or less. Note that the "$D_{50}$" designates a 50% diameter (or an accumulated 50% value for those having passed through sieves) in a case where volumetric-basis accumulated fractions have been calculated by a particle-diameter distribution measurement by means of laser-light diffraction/scattering method.

Taking the charging and discharging characteristics into consideration, it is preferable to use, as for the $SiO_x$, those whose specific surface area is larger. Meanwhile, those whose specific surface area is large excessively are not preferable, because the superficial coating (or SEI (i.e., Solid Electrolyte Interphase)) augments when the specific surface area is large excessively. When taking these into account, a specific surface area (e.g., a BET value, or a so-called BET specific surface area) of the $SiO_x$ can be from 2.5 m$^2$/g or more to 6.5 m$^2$/g or less.

Moreover, it is preferable that the $SiO_x$ can comprise a covering layer including a carbon material on the surface. Since a covering layer comprising a carbon material not only gives conductivity to the $SiO_x$ but also can prevent the reactions between the $SiO_x$ and hydrofluoric acid and the like, disposing the covering layer on the surface of the $SiO_x$ leads to upgrading the battery characteristics of the resulting lithium-ion secondary batteries. As for a carbon material of the covering layer, it is possible to use common materials. For example, it is preferable to use at least one member that is selected from the group consisting of natural graphite, artificial graphite, cokes, mesophase carbon, vapor-phase-grown carbon fibers, pitch-based carbon fibers, and polyacrylonitrile-based carbon fibers. Moreover, in order to form the covering layer, it is allowable to mix a silicon oxide with a carbon-material precursor and then calcine them. As for the carbon-material precursor, the following can be used preferably: organic compounds, such as various polymers containing carbon (e.g., sugars, glycols, and polypyrrole); the other organic compounds, such as acetylene blacks, which are transformable into carbon materials by means of calcination. As for methods other than the calcination, even using a mechanical surface fusion processing method, such as mechanofusion, or a vapor deposition method, such as CVD, results in making it possible to form the covering layer.

It is possible to set a formed amount of the covering layer at from 1 to 50% by mass with respect to a summed amount of the $SiO_x$ and covering layer. When the covering layer is less than 1% by mass, the advantageous effect of upgrading the conductivity cannot be obtained; whereas a proportion of the $SiO_x$ decreases relatively so that the resulting negative-electrode capacity has declined when the formed amount exceeds 50% by mass. It is preferable that the formed amount of the covering layer can fall in a range of from 5 to 30% by mass, and it is furthermore desirable that the formed amount can fall in a range of from 5 to 20% by mass.

Note that, in the case of disposing a covering layer comprising a carbon material on the surface of the $SiO_x$, a mass of the covering layer is included in "the content of the $SiO_x$ when a sum of the contents of $SiO_x$, graphite, conductive additive and binder resin is taken as 100% by mass." In other words, in this instance, a sum of a mass of the $SiO_x$ and a mass of the covering layer is regarded as the mass of the $SiO_x$. Note that a carbon material making the covering layer is distinguished from the claimed graphite, one of the constituent elements of the negative-electrode active material, and from carbonaceous fine particles contained in the claimed conductive additive.

Taking the resulting energy density into consideration, the greater an amount of the $SiO_x$ within the present negative-electrode material is the more preferable it is; whereas, taking the resultant cyclability into consideration, the less the amount is the more preferable it is. For example, an amount of the $SiO_x$ when the entire present negative-electrode material is taken as 100% mass, namely, it is believed that the resulting energy density in a laminated cell can be 380.1352 Wh/L approximately in a case where the content of the $SiO_x$ in the present negative-electrode material is 12% by mass. On the contrary, it is believed that the resultant energy density in a laminated cell can be 409 Wh/L approximately in a case where the content of the $SiO_x$ in the present negative-electrode material is 17% by mass. In order to upgrade the resulting energy density, it is possible to say that the content of the $SiO_x$ in the present negative-electrode material can be 17% by mass or more. Moreover, it is possible to say that the content can exceed 17% by mass. Considering the resultant energy density into consideration, a more preferable content of the $SiO_x$ in the present negative-electrode material can be 20% by mass or more, and a much more preferable content thereof can be 35% by mass or more.

Meanwhile, taking the resulting cyclability of the present electric storage device into consideration, the less an amount of the $SiO_x$ within the present negative-electrode material is the more preferable it is. This is because the $SiO_x$ is likely to break down comparatively. Taking the resultant cyclability into consideration, it is preferable that an amount of the $SiO_x$ within the present negative-electrode material can be 35% by mass or less, it is more preferable that the amount can be 32% by mass or less, and it is furthermore preferable that the amount can be 25% by mass or less. Therefore, when the entire present negative-electrode material is taken as 100% mass, it is allowable that an amount of the $SiO_x$ within the present negative-electrode material can be from 17% by mass or more to 40% by mass or less; it is preferable that the amount can exceed 17% by mass and can be 40% by mass or less; it is more preferable that the amount can be from 20% by mass or more to 40% by mass or less; it is furthermore preferable that the amount can exceed 20% by mass and can be 40% by mass or less; and it is much more preferable that the amount can be from 27% by mass or more to 32% by mass or less.

Graphite contributes to the charging and discharging of electric storage device along with $SiO_x$. In other words, in the electric storage device according to the present invention, the graphite constitutes the claimed negative-electrode active material along with the $SiO_x$. Moreover, graphite is expected to also have a function of buffering the volumetric changes of $SiO_x$ that are accompanied by charging and discharging. Therefore, graphite has the functions of both of negative-electrode active material and buffering agent combindely. Note that, since graphite excels in the conductivity, there also arises such a case where it constitutes apart of the resulting conductive paths. As for the claimed graphite, it is possible to use common graphites that are represented by "MAG," "SMG," "SCMG" (trademarks), and so on, but their types are not limited at all especially. Taking the resultant conductivity into consideration, the smaller a particle diameter of the graphite is the more preferable it is. Therefore, taking the resulting conductivity into consideration, it is preferable that an accumulated 50% particle diameter (i.e., "$D_{50}$") of the graphite can be 20 μm or less, and it is more preferable that the "$D_{50}$" can be 12 μm or less.

It is allowable to set up an amount of the graphite depending on the amount of the $SiO_x$, so that it is preferable that a mass ratio between the $SiO_x$ and the graphite can be $SiO_x$:Graphite=from 1:5 to 1:1 approximately. This applies similarly as to an amount of the claimed negative-electrode active material within the present negative electrode as well.

Note that it is permissible that the claimed negative-electrode active material in the negative-electrode material according to the present invention can even include a substance functioning as another negative-electrode active material besides the $SiO_x$ and graphite.

In the negative-material according to the present invention, acetylene black (or AB) being a kind of carbonaceous fine particles is used as the conductive additive. AB is a kind of carbon blacks, and the specific surface area is smaller and the bulk density is also smaller compared with those of KB. Consequently, AB is more likely to disperse, but less likely to agglomerate, compared with KB. Moreover, in order to upgrade the dispersibility of AB furthermore, it is preferable to use those whose particle diameter is smaller as for AB. For example, it is preferable to use AB whose average particle diameter is from 3 nm or more to 300 nm or less, and it is more preferable to use AB whose average particle diameter is from 10 nm or more to 100 nm or less. The "average particle diameter" being said herein likewise designates a mass average particle diameter in a grain-size distribution measurement by means of laser-light diffraction method, too.

As for the conductive additive, it is also allowable to use those which comprise the above-described carbonaceous fine particles alone, and it is even permissible to use those which contain a dispersion agent, and so on. A dispersion agent is a type of surfactants, and is an additive agent for upgrading the dispersibility of the carbonaceous fine particles.

The negative-electrode material and negative electrode according to the present invention is capable of further including a binder resin, a dispersion agent (or surfactant), and so on, besides the above-described $SiO_x$, graphite and conductive additive.

Although a type of the binder resin is not restrictive at all, the following can be exemplified: fluorine-based polymers, such as polyvinylidene fluoride (or PVDF) and polytetrafluoroethylene (or PTFE); rubbers, such as styrene-butadiene rubber (or SBR); imide-based polymers, such as polyimide; alkoxysilyl group-containing resins; polyacrylic acids; polymethacrylic acids; polyitaconic acids; and the like. Of these, it is preferable to use at least one member that is selected from the group consisting of polyamide-imide resins, polyamide-imide/silica hybrid resins, and polyacrylic acids.

When the entire present negative-electrode material is taken as 100% by mass, it is preferable that an amount of the binder resin can be from 8% by mass or more to 20% by mass or less. When the binder resin is less than 8% by mass, the formability of the resulting electrode declines; whereas, when it exceeds 20% by mass, the energy density of the resultant electrode declines. In the negative electrode according to the present invention, it is allowable that at least a part of these binder resins can even be included in such a state that they are modified by means of thermal decomposition, and so on. Note that the polyamide-imide/silica hybrid resin designates those in which a side chain, which derives from alkoxysilane, is formed at a molecular end of the polyamide-imide resin. For example, it is possible to use commercially-available products, such as alkoxy group-containing silane-modified polyamide-imide resins (e.g., "COMPOCERAN H900 (product name)," Part No. "H900-2," produced by ARAKAWA CHEMICAL INDUSTRIES, LTD.).

It is possible to fabricate the negative electrode according to the present invention by means of the following steps: coating (or laminating) a slurried substance, which have been made a slurry by adding an organic solvent to the above materials and then mixing them one another, onto a current collector by such a method as roll coating methods, dip coating methods, doctor blade methods, spray coating methods and curtain coating methods; and then causing the binder resin to cure by heating.

As for the current collector, it is allowable to employ those which have been common as current collectors for negative electrode for use in electric storage device. For example, it is possible to favorably use those in which a metal, such as Cu, has been formed as a configuration, such as foils, plates and sieve meshes, but it is not limited especially at all, as far as it has a material quality and configuration that comply with purposes.

In the electric storage device according to the present invention using the negative electrode being aforementioned, it is possible to use a publicly-known positive electrode, electrolytic solution and separator that are not limited especially at all. It is allowable that the positive electrode can be those which are employable in electric storage devices. The positive electrode comprises a current collector, a positive-electrode active-material layer bound onto the current collector. The positive-electrode active-material layer includes a positive-electrode active material, and a binder; but it is even permissible that the layer can further include a conductive additive. It is not restrictive especially at all as to the positive-electrode active material, conductive additive and binder; but it is advisable that they can be those being employable in electric storage devices.

As for a positive-electrode active material, it is possible to employ metallic lithium, S, and composite metallic oxides, such as $LiCoO_2$, $Li_2MnO_2$ or those whose general formula is $LiCo_pNi_qMn_rO_2$ (where "p"+"q"+"r"=1; 0<"p"<1; 0≤"q"<1; and 0≤"r"<1). Of these, as for the $LiCo_pNi_qMn_rO_2$ (where "p"+"q"+"r"=1; 0<"p"<1; 0≤"q"<1; and 0≤"r"<1), $LiCo_{1/3}Ni_{1/3}Mn_{1/3}O_2$, and $LiCo_{2/10}Ni_{5/10}Mn_{3/10}O_2$ can be exemplified; and the latter. $LiCo_{2/10}Ni_{5/10}Mn_{3/10}O_2$, can be employed especially favorably.

It is allowable that a current collector for the positive electrode can be those, such as aluminum, nickel and stainless steels, which have been employed commonly in the positive electrode of electric storage devices. An employable conductive additive can be the same ones as those which have been set forth in the above-mentioned negative electrode.

As for the electrolytic solution, it is possible to use those in which a supporting salt (or supporting electrolyte), such as an Li metallic salt, has been caused to dissolve in an organic solvent, for instance. As for the organic solvent, it is possible to use one or more members that are selected from the group consisting of nonprotonic organic solvents, such as propylene carbonate (or PC), ethylene carbonate (or EC), dimethyl carbonate (or DMC), diethyl carbonate (or DEC), ethyl methyl carbonate (or EMC) and fluoroethylene carbonate (or FEC), for instance. Taking the resulting cyclability into consideration, it is preferable that the organic solvent can include FEC. It is especially preferable that a mixed liquid, which includes FEC, EC, EMC and DMC, can be used as the organic solvent. As for the supporting salt (or supporting electrolyte), it is possible to use those, for example, such as $LiPF_6$, $LiBF_4$, $LiAsF_6$, LiI, $LiClO_4$ and LiCF$_3$SO$_3$ that are soluble in organic solvents, when the supporting salt (or supporting electrolyte) is an Li metallic salt. Although a preferable concentration of the supporting salt is not limited especially at all, it is possible to use a solution in which an Li metallic salt has been caused to dissolve in the above-described organic solvent (or mixed liquid of the organic solvents) in a concentration of from 0.5 mol/L to 1.7 mol/L approximately.

The separator is not limited especially at all as far as it can be those which can be employed in electric storage devices. The separator is one which separates a positive electrode from a negative electrode and vice versa, and which retains an electrolytic solution therein. It is possible to use thin microporous films, such as polyethylene and polypropylene, therefor. Note that, depending on a type of the resulting electric storage device (for example, in a case where the resultant electric storage device is a solid electrolyte secondary battery, and soon), such a case might also possibly arise where no separator is needed.

The electric storage device according to the present invention is not limited especially at all in terms of the configuration, so that it is possible to employ a variety of configurations, such as cylindrical types, laminated types and coin types. Even in a case where any one of the configurations is adopted, a battery is made as follows: the separators are interposed between the positive electrodes and the negative electrodes, thereby making electrode assemblies; and then these electrode assemblies are sealed hermetically in a battery case along with the electrolytic solution after connecting intervals to and from the positive-electrode terminals and negative-electrode terminals, which lead to the outside from the resulting positive-electrode current collectors and negative-electrode current collectors, with use of leads for collecting current, and the like. Moreover, not limited to the above-described lithium-ion secondary battery, it is possible to adapt an electric storage device according to the present invention to such applications as lithium polymer secondary batteries, sodium-ion batteries, sodium polymer secondary batteries, electric double-layer capacitors, and so on.

Hereinafter, the present invention will be explained in more detail while giving specific examples. Note that the following electric storage devices according to the respective trials were a lithium-ion secondary battery, respectively.

EXAMPLES

Trial No. 1

Preparation of Negative-Electrode Material for Electric Storage Device

SiO (e.g., a product of ALDRICH Corporation), and graphite (e.g., natural graphite, a product of HITACHI CHEMICAL Co., Ltd.) were made ready. The SiO had a "D$_{50}$" of 4 µm, and the graphite had a "D$_{50}$" of 9.2 µm. As a binder resin, an alkoxy group-containing silane-modified polyamide-imide resin ("COMPOCERAN (product name)," Part No. "H900-2," a product of ARAKAWA CHEMICAL INDUSTRIES, LTD.) was made ready. The binder resin's solvent composition was a mixture of N-methylpyrrolidone (or NMP) and xylene (or Xyl); its curable residual fraction was 30% by mass when the prior-to-curing binder resin was taken as 100% by mass; its viscosity was 8,000 mPa·s; its silica content within the curable residual fraction was 2% by mass. Note that the "curable residual fraction" means a solid content from which volatile components were taken away after the resin had been cured. As for a conductive additive, AB (or acetylene black) produced by DENKI KAGAKU KOGYO was made ready. The AB's true density was 1.8 g/cm$^3$, its primary particle diameter (i.e., "D$_{50}$," the median diameter) was from 11 to 18 nm, and its BET value was 180 m$^2$/g. The SiO$_x$'s BET value was 16.97 m$^2$/g, and the graphite's BET value was 3.8162 m$^2$/g. Using the SiO, graphite, binder resin and conductive additive, a negative electrode was made as follows.

The aforementioned active materials, conductive additive and binder resin were mixed in such a mass ratio as, SiO:Graphite:Conductive Additive:Binder Resin=22:60:3:15. On this occasion, a blended proportion of the SiO was 27% by mass when a summed amount of the graphite's mass and the SiO's mass was taken as 100% by mass. Into the aforementioned mixture, NMP serving as a solvent was put in a proper amount to make an adjustment, thereby turning the mixture into a slurry.

The aforementioned slurry was put onto an electrolyzed copper foil with 20 µm in thickness, and then the slurry was coated onto the electrolyzed copper foil in a film shape using a doctor blade. After the NMP had been volatilized to be removed by drying the obtained sheet at 80° C. for 20 minutes, the current collector, and the coated substance on the current collector were adhesion joined firmly by means of a roll pressing machine. The joined substance was heated at 200° C. for 2 hours by a vacuum drying machine, and was cut out to a predetermined configuration (e.g., a rectangular shape with a size of 26 mm×31 mm), thereby obtaining a negative electrode according to Trial No. 1 whose thickness was 15 µm approximately.

First of all, an SiO powder was heat treated at 900° C. for 2 hours, thereby preparing an SiO powder whose average particle diameter was 6.5 µm. Since the SiO powder comprised homogenous sold SiO whose ratio between Si and O was 1:1 roughly, the heat treatment separated the SiO powder into two phases, an Si phase and an SiO$_2$ phase, by means of the internal reactions in the solid. The Si phase, which was obtained by the separation, was fine extremely. That is, the thus obtained SiO powder was an aggregate of SiO particles. Moreover, the SiO particles made a structure in which the very fine Si particles were dispersed within the SiO$_2$ matrix.

The resulting SiO powder was mixed with a mixture in which acetylene black (AB) serving as a conductive additive, natural graphite, and polyamide-imide (or PAI) serving as a binder resin had been dissolved in N-methylpyrrolidone serving as an organic solvent. Thus, a slurry-like negative-electrode material was prepared. On this occasion, to a mixture in which the PAI had been dissolved in the NMP, the respective materials were added one after another in the following order: the AB, the SiO, and the graphite. As for the AB, AB whose true density was 1.8 g/cm$^3$, primary particle diameter (i.e., "D$_{50}$," the median diameter) was from 11 to 18 nm, and BET value was 180 m$^2$/g was used. As for the graphite, graphite, a product of HITACH KASEI KOGYO Co., Ltd., whose particle diameter (i.e., "D$_{50}$," the median diameter) was 9.2 µm was used. As for the PAI, one of COMPOCERAN AI (product name) series, a product of ARAKAWA CHEMICAL INDUSTRIES, LTD., whose part No. was "AI-301," was used. A compositional ratio between the respective components (or solid contents) within the resulting negative-electrode material was such a mass ratio as SiO$_x$:Graphite:AB:PAI=22:60:3:15.

Note that the BET value of the SiO$_x$ used in Trial No. 1 was 16.97 m$^2$/g, and that the true density of the AB used therein was 1.8 g/cm$^3$. The BET value of the graphite was 3.8162 m²/g. Table 1 below shows the composition of the negative-electrode material according to Trial No. 1, and the compositions of negative-electrode materials according to later-described Trial Nos. 2 through 10.

A slurry of the negative-electrode material, which had been obtained by the above-mentioned procedure, was coated onto a current collector, thereby lamination forming a negative-electrode material layer on the current collector. To be concrete, the slurry was coated onto the surfaces of an electrolyzed copper foil (i.e., a current collector), whose thickness was 20 μm, using a doctor blade.

The obtained laminated body was dried at 80° C. for 15 minutes, thereby removing the organic solvent from the negative-electrode material layer by causing it to volatilize. After the drying, the resulting green electrode was adjusted in terms of the density by means of a roll pressing machine. Thereafter, the laminated body was subjected to heat curing at 200° C. for 2 hours with use of a vacuum drying furnace, thereby forming a negative-electrode material layer (or solid contents) having a thickness of 15 μm approximately in the uppermost layer of the current collector. Thereafter, the laminated body was cooled naturally to obtain a negative electrode according to Trial No. 1.

Making of Positive Electrode

A slurry-like positive-electrode material was prepared by mixing "L333" (i.e., $Li_1(CO_{1/3}Ni_{1/3}Mn_{1/3})O_2$) serving as the positive-electrode material, acetylene black (or AB) serving as the conductive additive, and polyvinylidene fluoride (or PVDF) serving as the binder resin one another. A compositional ratio between the respective components (or solid contents) within the resulting slurry was such a mass ratio as "L333":AB:PVDF=88:6:6. A positive-electrode material layer was lamination formed on a current collector by coating the slurry onto the current collector. To be concrete, the slurry was coated onto the surfaces of an aluminum foil (i.e., a current collector), whose thickness was 20 μm, using a doctor blade.

Thereafter, the organic solvent was volatilized in order to remove it from the resulting positive-electrode material layer by drying the coated current collector at 80° C. for 15 minutes. After the drying, the resulting green electrode was adjusted in terms of the density by a roll pressing machine. Thereafter, a positive electrode, in which a positive-electrode material layer (or solid contents) having a thickness of 50 μm approximately was completed by laminating it in the uppermost layer of the current collector, was obtained by subjecting the coated current collector having been dried to heat curing at 200° C. for 2 hours with use of a vacuum drying furnace.

Fabricating of Electric Storage Device

After cutting the resulting positive electrode to a size of 30 mm×25 mm and cutting the resultant negative electrode to a size of 31 mm×26 mm, they were accommodated between laminated films as follows. A rectangle-shaped sheet, which comprised a polypropylene resin and whose shape was a 40×40 mm square and thickness was 30 μm, was interposed or held between the positive electrode and the negative electrode as a separator to make a polar-plate subassembly. This polar-plate subassembly was covered with laminated films in which two pieces made a pair. After sealing the laminated films at the three sides, the above-mentioned electrolytic solution was then injected into the laminated films which had been turned into a bag shape. Thereafter, the remaining one side was sealed, thereby obtaining a laminated cell whose four sides were sealed air-tightly and in which the polar-plate subassembly and electrolytic solution were closed hermetically. For the electrolytic solution, a mixture solution was used which comprised: a mixed solution including FEC (i.e., fluoroethylene carbonate), EC (i.e., ethylene carbonate), EMC (i.e., ethyl methyl carbonate) and DMC (i.e., dimethyl carbonate) in a ratio of FEC:EC:EMC:DMC=0.4:2.6:3:4 by volume; and $LiPF_6$ dissolved in the mixed solution in a concentration that made 1 mol/L.

The positive electrode and negative electrode were provided with a tab being electrically connectable to the outside, respectively, and that the tabs extended out partially to the outside of the resulting laminated cell. A laminated-cell-shaped (or two-electrode pouched cellular) electric storage device was obtained by those steps as above.

Trial No. 2

Other than the blended amounts of the conductive additive and binder resin, a negative-electrode material according to Trial No. 2 was the same material as the negative-electrode material according to Trial No. 1. In the negative-electrode material according to Trial No. 2, a compositional ratio between the respective components (or solid contents) within the negative-electrode material was as follows: $SiO_x$:Graphite:AB:PAI=22:60:6:12 by mass. A negative electrode and electric storage device according to Trial No. 2 were those which had been manufactured with the distinct negative-electrode material according to Trial No. 2 but by the same method as that of Trial No. 1.

Trial No. 3

Other than the blended amounts of the conductive additive and binder resin, a negative-electrode material according to Trial No. 3 was the same material as the negative-electrode material according to Trial No. 1. In the negative-electrode material according to Trial No. 3, a compositional ratio between the respective components (or solid contents) within the negative-electrode material was as follows: $SiO_x$:Graphite:AB:PAI=22:60:8:10 by mass. A negative electrode and electric storage device according to Trial No. 3 were those which had been manufactured with the distinct negative-electrode material according to Trial No. 3 but by the same method as that of Trial No. 1.

Trial No. 4

Other than the blended amounts of the conductive additive and binder resin, a negative-electrode material according to Trial No. 4 was the same material as the negative-electrode material according to Trial No. 1. In the negative-electrode material according to Trial No. 4, a compositional ratio between the respective components (or solid contents) within the negative-electrode material was as follows: $SiO_x$:Graphite:AB:PAI=22:60:10:8 by mass. A negative electrode and electric storage device according to Trial No. 4 were those which had been manufactured with the distinct negative-electrode material according to Trial No. 4 but by the same method as that of Trial No. 1.

Trial No. 5

Other than the blended amounts of the conductive additive and binder resin, a negative-electrode material according to Trial No. 5 was the same material as the negative-electrode material according to Trial No. 1. In the negative-electrode material according to Trial No. 5, a compositional ratio between the respective components (or solid contents) within the negative-electrode material was as follows: $SiO_x$:Graphite:AB:PAI=22:60:12:6 by mass. A negative electrode and electric storage device according to Trial No. 5 were those which had been manufactured with the distinct negative-electrode material according to Trial No. 5 but by the same method as that of Trial No. 1.

Trial No. 6

Except that KB was used as the conductive additive, a negative-electrode material according to Trial No. 6 was the same material as the negative-electrode material according to Trial No. 1. In the negative-electrode material according to Trial No. 6, a compositional ratio between the respective components (or solid contents) within the negative-electrode material was as follows: $SiO_x$:Graphite:KB:PAI=22:60:3:15 by mass. A negative electrode and electric storage device according to Trial No. 6 were those which had been manufactured with the distinct negative-electrode material according to Trial No. 6 but by the same method as that of Trial No. 1.

Trial No. 7

Except that KB was used as the conductive additive, a negative-electrode material according to Trial No. 7 was the same material as the negative-electrode material according to Trial No. 2. In the negative-electrode material according to Trial No. 7, a compositional ratio between the respective components (or solid contents) within the negative-electrode material was as follows: $SiO_x$:Graphite:KB:PAI=22:60:6:12 by mass. A negative electrode and electric storage device according to Trial No. 7 were those which had been manufactured with the distinct negative-electrode material according to Trial No. 7 but by the same method as that of Trial No. 1.

Trial No. 8

Other than the blended amounts of the $SiO_x$, graphite, conductive additive and binder resin and the composition of the electrolytic solution, a negative-electrode material according to Trial No. 8 was the same material as the negative-electrode material according to Trial No. 1. In the negative-electrode material according to Trial No. 8, a compositional ratio between the respective components (or solid contents) within the negative-electrode material was as follows: $SiO_x$:Graphite:AB:PAI=32:50:6:12 by mass. As for the electrolytic solution, a mixture solution was used which comprised: a mixed solution including EC, EMC and DMC in a ratio of EC:EMC:DMC=3:3:4 by volume; and $LiPF_6$ dissolved in the mixed solution in a concentration that made 1 mol/L. A negative electrode and electric storage device according to Trial No. 8 were those which had been manufactured with the distinct negative-electrode material according to Trial No. 8 but by the same method as that of Trial No. 1.

Trial No. 9

Other than the blended amounts of the conductive additive and binder resin, a negative-electrode material according to Trial No. 9 was the same material as the negative-electrode material according to Trial No. 8. In the negative-electrode material according to Trial No. 9, a compositional ratio between the respective components (or solid contents) within the negative-electrode material was as follows: $SiO_x$:Graphite:AB:PAI=32:50:8:10 by mass. A negative electrode and electric storage device according to Trial No. 9 were those which had been manufactured with the distinct negative-electrode material according to Trial No. 9 but by the same method as that of Trial No. 1.

Trial No. 10

Other than the blended amounts of the conductive additive and binder resin, a negative-electrode material according to Trial No. 10 was the same material as the negative-electrode material according to Trial No. 8. In the negative-electrode material according to Trial No. 10, a compositional ratio between the respective components (or solid contents) within the negative-electrode material was as follows: $SiO_x$:Graphite:AB:PAI=32:50:12:6 by mass. A negative electrode and electric storage device according to Trial No. 10 were those which had been manufactured with the distinct negative-electrode material according to Trial No. 10 but by the same method as that of Trial No. 1.

TABLE 1

|  |  | Trial No. | | | | | | | | | |
|---|---|---|---|---|---|---|---|---|---|---|---|
|  |  | 1 | 2 | 3 | 4 | 5 | 6 | 7 | 8 | 9 | 10 |
| $SiO_x$ (g) |  | 22 | 22 | 22 | 22 | 22 | 22 | 22 | 32 | 32 | 32 |
| Graphite (g) |  | 60 | 60 | 60 | 60 | 60 | 60 | 60 | 50 | 50 | 50 |
| Conductive | AB | 3 | 6 | 8 | 10 | 12 | — | — | 6 | 8 | 12 |
| Additive | KB | — | — | — | — | — | 3 | 6 | — | — | — |
| (g) |  |  |  |  |  |  |  |  |  |  |  |
| PAI (g) |  | 15 | 12 | 10 | 8 | 6 | 15 | 12 | 12 | 10 | 6 |

Observation on Cross Section in Negative Electrode by Means of SEM

Figure 1:
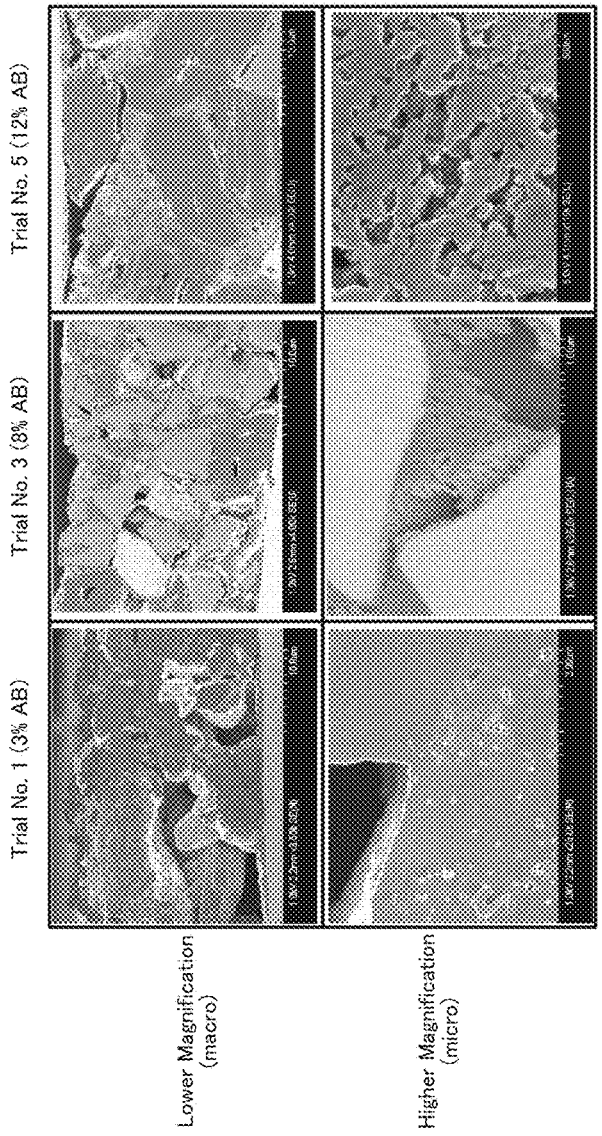
FIG. 1 is SEM photographs of a cross section in negative electrodes according to Trial Nos. 1, 3, and 5.

A cross section in the negative electrodes according to Trial Nos. 1, 3 and 5 was observed by means of a scanning electron microscope (or SEM), and then the images were taken on an SEM photograph, respectively. FIG. 1 shows the resulting SEM photographs of the cross section of the negative electrodes according to Trial Nos. 1, 3 and 5.

As shown at the top line in FIG. 1, comparatively large gaps or spaces (or macro spaces) were formed within the electrode in a case where the blended amount of the conductive additive was less (see Trail No. 1 with 3%-by-mass AB). As the blended amount of the conductive additive was made more, the macro spaces decreased (see Trial No. 3 with 8%-by-mass AB, and Trial No. 5 with 12%-by-mass AB). Meanwhile, as shown at the bottom line in FIG. 1, micro-fine gaps or spaces (or micro spaces) were formed more within the electrode in another case where the blended amount of the conductive additive was more (see Trial No. 3 with 8%-by-mass AB, and Trial No. 5 with 12%-by-mass AB). The micro spaces were formed between the $SiO_x$ portions mutually.

Charging-Discharging Test

Figure 2:
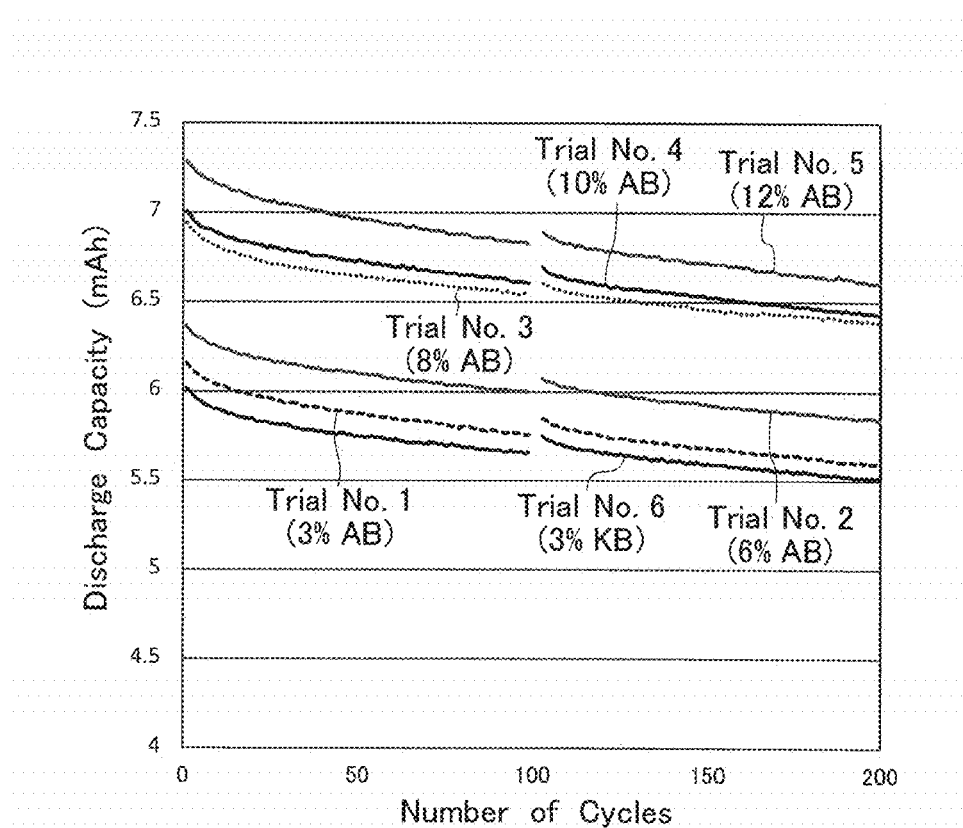
FIG. 2 is a graph that shows the cyclability of lithium-ion secondary batteries according to Trial Nos. 1 through 6, respectively, and the vertical axis specifies the discharge capacities thereof.
Figure 3:
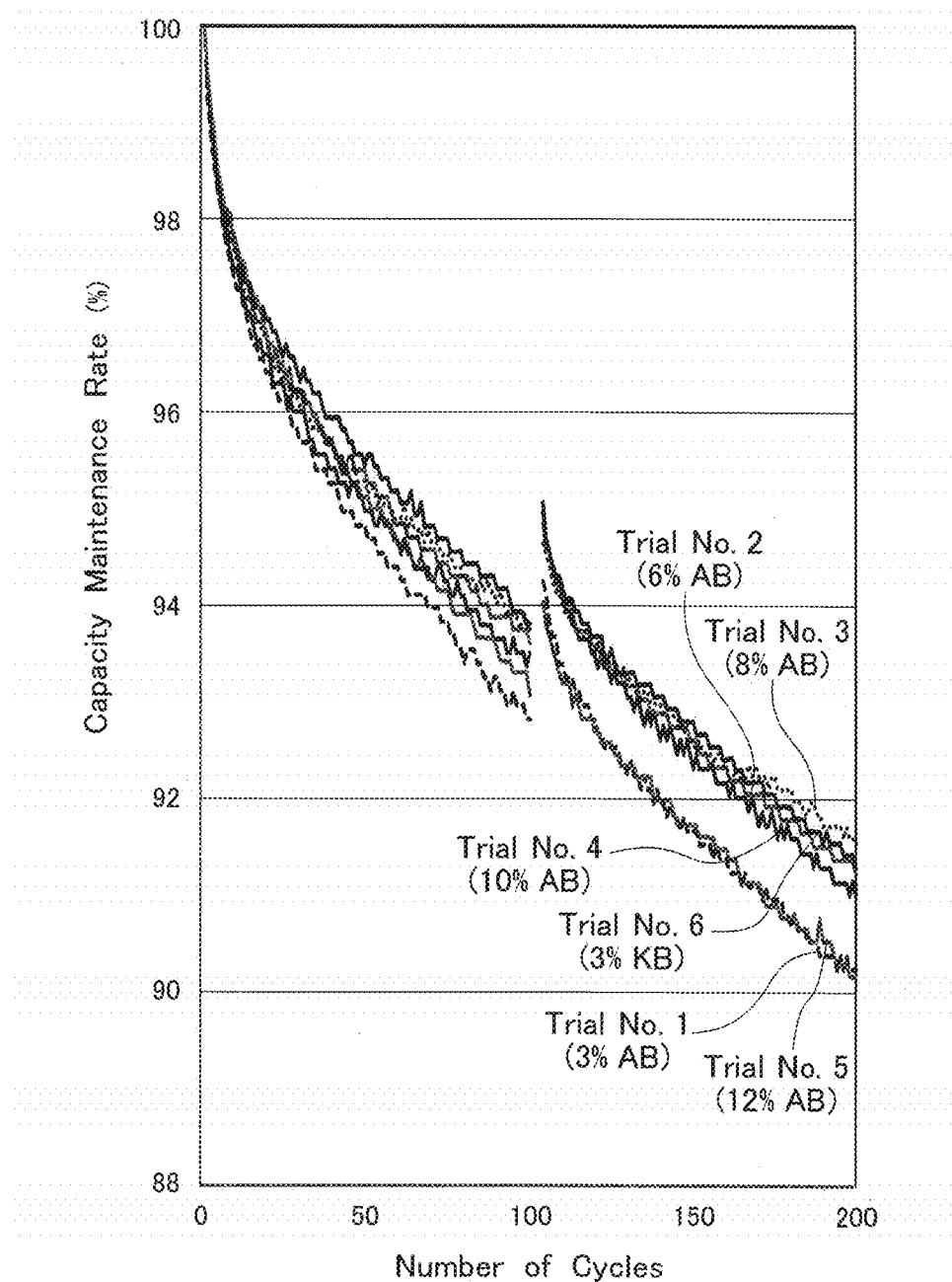
FIG. 3 is a graph that shows the cyclability of the lithium-ion secondary batteries according to Trial Nos. 1 through 6, respectively, and the vertical axis specifies the discharge-capacity maintenance rates thereof.

Under the following conditions: a current density making 16 mA per 1-$cm^2$ negative-electrode active material; 3V discharge cut-off voltage; 4.2V charge cut-off voltage; and 25° C. temperature, charging and discharging operations were carried out repetitively for the electric storage devices according to Trial Nos. 1 through 10, thereby measuring the discharge capacities of the electric storage devices at the respective cycles. Note that a load-characteristic test was carried out over a period of from the 100th to 103rd cycles. FIGS. 2 through 6 show graphs that illustrate the cyclabilities of the respective electric storage devices. To be concrete, FIGS. 2 and 3 are graphs that illustrate the cyclabilities of the electric storage devices according to Trial Nos. 1 through 6. FIGS. 4 and 5 are graphs that illustrate the cyclabilities of the electric storage devices according to Trial Nos. 8 through 10. FIG. 6 is a graph that illustrates initial discharge capacities when a discharging operation was carried out at 0.3 C for the same devices as the electric storage devices according to Trial Nos. 1 through 7.

Note that the vertical axis in FIG. 2, FIG. 4 and FIG. 6 stands for the discharge capacities (mAh). The vertical axis in FIG. 3 and FIG. 5 stands for the discharge-capacity maintenance rates (%). The "discharge-capacity maintenance rate" designates a discharge capacity (%) at each of the cycles, respectively, when a discharge capacity at the first cycle is taken as 100%. An electric storage device whose discharge-capacity maintenance rates (%) are lower exhibits larger discharge-capacity declines being associated with repetitive charging and discharging operations, so that it is possible say that the device is poor in terms of the cyclability.

Moreover, declining magnitudes indirect-current resistance (or IR drops) were calculated for the electric storage devices according to Trial Nos. 1 through 7 by means of the equation, $\Delta V/I$ (units in $\Omega$), using a factor, $I=3.4\times10^{-3}$ (units in A), in which the $\Delta V$ (units in V) was labeled as a voltage variation magnitude from the start of discharging up to 10 seconds later when the remaining battery power was 20%. FIG. 7 shows a graph that illustrates the discharge IR drops in the electric storage devices according to Trial Nos. 1 through 7.

As shown in FIG. 2, the discharge capacities (mAh) of the electric storage devices according to Trial Nos. 1 through 6 became larger in the following order: Trial No. 5 (with 12%-by-mass AB)>Trial No. 4 (with 10%-by-mass AB)>Trial No. 3 (with 8%-by-mass AB)>Trial No. 2 (with 6%-by-mass AB)>Trial No. 1 (with 3%-by-mass AB)>Trial No. 6 (with 3%-by-mass KB). From this result, it was understood that the discharge capacity upgrades more when AB is used as the conductive additive than when KB is used, and that the greater an amount of the conductive additive is the more the discharge capacity upgrades.

However, as shown in FIG. 3, the declines in the discharge-capacity maintenance rates (%) were less in Trial No. 2 (with 6%-by-mass AB), Trial No. 3 (with 8%-by-mass AB), Trial No. 4 (with 10%-by-mass AB) and Trial No. 6 (with 3%-by-mass KB) than in Trial No. 1 (with 3%-by-mass AB) and Trial No. 5 (with 12%-by-mass AB), regarding the discharge-capacity maintenance rates (%) of the electric storage devices according to Trail Nos. 1 through 6. To put it differently, capacity declines can be inhibited in an electric storage device whose AB content is from 6 to 10% to the same extent as those in a conventional electric storage device whose KB content is 3% by mass. Taking the discharge capacities having been thus inhibited from declining into consideration, it is possible to say from the result that it is preferable that the AB content can be from 6 to 10% by mass.

As to the electric storage device whose AB content was 12% by mass as well, note that, since the capacity declines were the same extent as those in the electric storage device whose AB content was 3% by mass, it was a device that can fully withstand employments.

Moreover, as shown in FIG. 4, the discharge capacities (mAh) of the electric storage devices according to Trial Nos. 8 through 10 became larger in the following order: Trial No. 9 (with 8%-by-mass AB)>Trial No. 8 (with 6%-by-mass AB)>Trial No. 10 (with 12%-by-mass AB). However, as shown in FIG. 5, the discharge-capacity maintenance rates (%) became larger in the following order: Trial No. 8 (with 6%-by-mass AB)>Trial No. 9 (with 8%-by-mass AB)>Trial No. 10 (with 12%-by-mass AB). To put it differently, the capacity declines in the electric storage devices were inhibited in the following order: 6%-by-mass AB content>8%-by-mass AB content>12%-by-mass AB content. In particular, when the AB content was from 6% by mass to 8% by mass, it was possible to greatly inhibit the capacities of the electric storage devices from declining. Taking the discharge capacities having been thus inhibited from declining into consideration, it is possible to say from the result, too, that it is preferable that the AB content can be from 6 to 10% by mass. In addition, it is also understood from the result that the discharge-capacity maintenance rates are little dependent on the blended proportions of the $SiO_x$ and the compositions of the electrolytic solutions.

Moreover, as shown in FIG. 6, it was understood that using AB as the conductive additive enables the initial discharge capacities to upgrade more compared with the case of using KB therefor. Moreover, it was also understood that the more the AB content is the more the initial discharge capacity upgrades.

In addition, as shown in FIG. 7, in the case where the conductive additive was included more (in an amount of 6% by mass or more, for instance), the discharge IR drops ($\Omega$) were smaller when AB was used as the conductive additive than when KB was used therefor, and the more the content of AB was the more the discharge IR drop ($\Omega$) declined. Since the discharge IR drop becomes smaller when the conductivity is higher, using AB as the conductive additive enables the resulting conductivity to upgrade more than using KB therefor, and it is possible to say that the more the content of AB is the more the resultant conductivity upgrades. To put it differently, it is possible to say that the negative-electrode material according to the present invention using AB as the conductive additive in an amount of 6% by mass or more excels in the conductivity.

When taking notice of inhibiting the discharge capacities from declining, it is preferable that the content of AB can be from 6% by mass or more to 10% by mass or less; whereas, when taking notice of upgrading the resulting conductivity and upgrading the resultant discharge capacities, it is possible to say that the content of AB can preferably be from 8% by mass or more to 12% by mass or less. In addition, when taking all of the following into account: inhibiting the discharge capacities from declining; upgrading the resulting conductivity; and upgrading the resultant discharge capacities, it is possible to say that the content of AB can be from 8% by mass or more to 10% by mass or less.

Trial No. 11

Other than the graphite whose "$D_{50}$" was 9.2 µm and the content of the $SiO_x$, a negative-electrode material according to Trial No. 11 was the same material as the negative-electrode material according to Trial No. 1. In the negative-electrode material according to Trial No. 11, a compositional ratio between the respective components (or solid contents) within the negative-electrode material was as follows: $SiO_x$:

Graphite:AB:PAI=12:70:8:10 by mass. A negative electrode and electric storage device according to Trial No. 11 were those which had been manufactured with the distinct negative-electrode material according to Trial No. 11 but by the same method as that of Trial No. 1.

Trial No. 12

Other than the graphite whose "$D_{50}$" was 9.2 µm and the content of the $SiO_x$, a negative-electrode material according to Trial No. 12 was the same material as the negative-electrode material according to Trial No. 1. In the negative-electrode material according to Trial No. 12, a compositional ratio between the respective components (or solid contents) within the negative-electrode material was as follows: $SiO_x$:Graphite:AB:PAI=17:65:8:10 by mass. A negative electrode and electric storage device according to Trial No. 12 were those which had been manufactured with the distinct negative-electrode material according to Trial No. 12 but by the same method as that of Trial No. 1.

Trial No. 13

Other than the graphite whose "$D_{50}$" was 9.2 µm and the content of the $SiO_x$, a negative-electrode material according to Trial No. 13 was the same material as the negative-electrode material according to Trial No. 1. In the negative-electrode material according to Trial No. 13, a compositional ratio between the respective components (or solid contents) within the negative-electrode material was as follows: $SiO_x$:Graphite:AB:PAI=32:50:8:10 by mass. A negative electrode and electric storage device according to Trial No. 13 were those which had been manufactured with the distinct negative-electrode material according to Trial No. 13 but by the same method as that of Trial No. 1.

Trial No. 14

Other than the graphite whose "$D_{50}$" was 20 µm and the content of the $SiO_x$, a negative-electrode material according to Trial No. 14 was the same material as the negative-electrode material according to Trial No. 1. In the negative-electrode material according to Trial No. 14, a compositional ratio between the respective components (or solid contents) within the negative-electrode material was as follows: $SiO_x$:Graphite:AB:PAI=32:50:8:10 by mass. A negative electrode and electric storage device according to Trial No. 14 were those which had been manufactured with the distinct negative-electrode material according to Trial No. 14 but by the same method as that of Trial No. 1.

Trial No. 15

Other than the graphite whose "$D_{50}$" was 20 µm and the content of the $SiO_x$, a negative-electrode material according to Trial No. 15 was the same material as the negative-electrode material according to Trial No. 1. In the negative-electrode material according to Trial No. 15, a compositional ratio between the respective components (or solid contents) within the negative-electrode material was as follows: $SiO_x$:Graphite:AB:PAI=37:45:8:10 by mass. A negative electrode and electric storage device according to Trial No. 15 were those which had been manufactured with the distinct negative-electrode material according to Trial No. 15 but by the same method as that of Trial No. 1.

Charging-Discharging Test

Under the following conditions: a current density making 16 mA per 1-cm² negative-electrode active material; 3V discharge cut-off voltage; 4.2V charge cut-off voltage; and 25° C. temperature, charging and discharging operations were carried out repetitively for the electric storage devices according to Trial Nos. 11 through 15, thereby measuring the discharge capacities of the electric storage devices at the respective cycles. FIG. 8 and FIG. 9 show graphs that illustrate the cyclabilities of the respective electric storage devices. Note that FIG. 8 is a graph that illustrates the cyclabilities of the electric storage devices according to Trial Nos. 11 through 13. FIG. 9 is a graph that illustrates the cyclabilities of the electric storage devices according to Trial No. 14 and Trial No. 15. Note that the vertical axis in FIG. 8 and FIG. 9 stands for the discharge-capacity maintenance rates (%) in the same manner as the vertical axis in FIG. 3 and FIG. 5.

As shown in FIG. 8, the discharge-capacity maintenance rates (%) of the electric storage devices according to Trial Nos. 11 through 13 were fully high even after 900 cycles had elapsed; whereas the discharge-capacity maintenance rates (%) of the electric storage devices according to Trial Nos. 14 and 15 were fully high even after 500 cycles had elapsed. From these results, it is possible to say that electric storage devices whose discharge-capacity maintenance rate declines less, namely, electric storage devices that excel in the cyclability, are obtainable when the content of the $SiO_x$ with respect to a sum of the contents of the $SiO_x$, graphite, conductor additive and binder resin being taken as 100% by mass (hereinafter, being simply abbreviated to as "the content of the $SiO_x$") falls within a range of from 12 to 37% by mass. Moreover, because of the fact that even the electric storage device according to Trial No. 15 whose $SiO_x$ content was 37% by mass showed the cyclability that excelled fully, it is possible to say that electric storage devices excelling in the cyclability are obtainable when "the content of the $SiO_x$ is more than 37% by mass, for example, even when the content is 40% by mass approximately.

Trial No. 16

Other than the graphite whose "$D_{50}$" was 12 µm, the $SiO_x$ whose "$D_{50}$" was 1.37 µm, and "the content of the $SiO_x$," a negative-electrode material according to Trial No. 16 was the same material as the negative-electrode material according to Trial No. 1. To be concrete, some of the $SiO_x$ (or a fine powder thereof), which was identical with that of Trial No. 1 but which had been classified with a sieve and had passed through the one-micrometer sieve openings, was used, as for the $SiO_x$. In the negative-electrode material according to Trial No. 16, a compositional ratio between the respective components (or solid contents) within the negative-electrode material was as follows: $SiO_x$:Graphite:AB:PAI=32:50:8:10 by mass. A negative electrode and electric storage device according to Trial No. 16 were those which had been manufactured with the distinct negative-electrode material according to Trial No. 16 but by the same method as that of Trial No. 1.

Trial No. 17

Other than the graphite whose "$D_{50}$" was 12 µm, the $SiO_x$ whose "$D_{50}$" was 4.374 µm, and "the content of the $SiO_x$," a negative-electrode material according to Trial No. 17 was the same material as the negative-electrode material according to Trial No. 1. To be concrete, the same $SiO_x$, which was identical with that of Trial No. 1, was used as it was (i.e., without cutting), as for the $SiO_x$. In the negative-electrode material according to Trial No. 17, a compositional ratio between the respective components (or solid contents) within the negative-electrode material was as follows: $SiO_x$:Graphite:AB:PAI=32:50:8:10 by mass. A negative electrode and electric storage device according to Trial No. 17 were those which had been manufactured with the distinct negative-electrode material according to Trial No. 17 but by the same method as that of Trial No. 1.

Trial No. 18

Other than the graphite whose "$D_{50}$" was 12 μm, the $SiO_x$ whose "$D_{50}$" was 5.713 μm, and "the content of the $SiO_x$," a negative-electrode material according to Trial No. 18 was the same material as the negative-electrode material according to Trial No. 1. To be concrete, some of the $SiO_x$, which was identical with that of Trial No. 1 but which had been classified with a sieve but had not passed through the one-micrometer sieve openings (i.e., one-micrometer cutting), was used, as for the $SiO_x$. In the negative-electrode material according to Trial No. 18, a compositional ratio between the respective components (or solid contents) within the negative-electrode material was as follows: $SiO_x$:Graphite:AB:PAI=32:50:8:10 by mass. A negative electrode and electric storage device according to Trial No. 18 were those which had been manufactured with the distinct negative-electrode material according to Trial No. 18 but by the same method as that of Trial No. 1.

Trial No. 19

Other than the graphite whose "$D_{50}$" was 12 μm, the $SiO_x$ whose "$D_{50}$" was 6.357 μm, and "the content of the $SiO_x$," a negative-electrode material according to Trial No. 19 was the same material as the negative-electrode material according to Trial No. 1. To be concrete, some of the $SiO_x$, which was identical with that of Trial No. 1 but which had been classified with a sieve but had not passed through the two-micrometer sieve openings (i.e., two-micrometer cutting), was used, as for the $SiO_x$. In the negative-electrode material according to Trial No. 19, a compositional ratio between the respective components (or solid contents) within the negative-electrode material was as follows: $SiO_x$:Graphite:AB:PAI=32:50:8:10 by mass. A negative electrode and electric storage device according to Trial No. 19 were those which had been manufactured with the distinct negative-electrode material according to Trial No. 19 but by the same method as that of Trial No. 1.

Trial No. 20

Other than the graphite whose "$D_{50}$" was 12 μm, the $SiO_x$ whose "$D_{50}$" was 7.211 μm, and "the content of the $SiO_x$," a negative-electrode material according to Trial No. 20 was the same material as the negative-electrode material according to Trial No. 1. To be concrete, some of the $SiO_x$, which was identical with that of Trial No. 1 but which had been classified with a sieve but had not passed through the four-micrometer sieve openings (i.e., four-micrometer cutting), was used, as for the $SiO_x$. In the negative-electrode material according to Trial No. 20, a compositional ratio between the respective components (or solid contents) within the negative-electrode material was as follows: $SiO_x$:Graphite:AB:PAI=32:50:8:10 by mass. A negative electrode and electric storage device according to Trial No. 20 were those which had been manufactured with the distinct negative-electrode material according to Trial No. 20 but by the same method as that of Trial No. 1.

Charging-Discharging Test

Under the following conditions: a current density making 16 mA per 1-$cm^2$ negative-electrode active material; 3V discharge cut-off voltage; 4.2V charge cut-off voltage; and 25° C. temperature, charging and discharging operations were carried out repetitively for the electric storage devices according to Trial Nos. 16 through 20, thereby measuring the discharge-capacity maintenance rates of the electric storage devices at the time when 500 cycles had elapsed. Those results are shown in Table 2.

TABLE 2

| | Note (Treatment to $SiO_x$) | BET | $D_{10}$ (μm) | $D_{50}$ (μm) | $D_{90}$ (μm) | Capacity Maintenance Rate (%) |
|---|---|---|---|---|---|---|
| Trial No. 16 | Fine Powder | 16.299 | 0.470 | 1.370 | 5.355 | 74.0739 |
| Trial No. 17 | Without Cutting | 6.5574 | 1.391 | 4.374 | 7.986 | 78.8247 |
| Trial No. 18 | 1-μm Cutting | 3.3479 | 3.414 | 5.713 | 8.817 | 91.4198 |
| Trial No. 19 | 2-μm Cutting | 2.8029 | 4.401 | 6.357 | 9.196 | 91.0000 |
| Trial No. 20 | 4-μm Cutting | 2.6452 | 5.358 | 7.211 | 9.981 | 92.6794 |

As shown in Table 2, as the particle diameters of the $SiO_x$ became larger, the capacity maintenance rates (%) at the time when 500 cycles had elapsed also became larger in the case where the "$D_{50}$" of the graphite was 12 μm. To be concrete, it is preferable that the "$D_{50}$" of the $SiO_x$ can be 4.4 μm or more; it is more preferable that the "$D_{50}$" can be 5.7 μm or more; it is furthermore preferable that the "$D_{50}$" can be 6.4 μm or more; and it is much more preferable that the "$D_{50}$" can be from 5.7 μm to 7.8 μm. Note that the "$D_{50}$" of the graphite was 12 μm in Trial Nos. 16 through 20. A preferable "$D_{50}$" of the $SiO_x$ can be 4.4 μm or more. Consequently, it is possible to say that the "$D_{50}$" of the $SiO_x$ can preferably exceed ⅓ of the graphite's "$D_{50}$." Moreover, since a preferable "$D_{50}$" of the $SiO_x$ can be from 5.7 μm to 7.8 μm, it is possible to say that the "$D_{50}$" of the $SiO_x$ can furthermore preferably exceed ⅖ of the graphite's "$D_{50}$."

Trial No. 21

Other than "the content of the $SiO_x$," an electric storage device according to Trial No. 21 was the same device as the electric storage device according to Trial No. 1. To be concrete, in the electric storage device according to Trial No. 21, a compositional ratio between the respective components (or solid contents) within the negative-electrode material was as follows: $SiO_x$:Graphite:AB:PAI=32:50:8:10 by mass. The electric storage device according to Trial No. 21 was a device that had been manufactured by the same method as that of Trial No. 1.

Trial No. 22

Other than the composition of the electrolytic solution and "the content of the $SiO_x$," an electric storage device according to Trial No. 22 was the same device as the electric storage device according to Trial No. 1. To be concrete, as an organic solvent for the electrolytic solution, a mixed liquid of EC, EMC and DMC was used in which the respective constituents made such a ratio as EC:EMC: DMC=3:3:4. In other words, this organic-solvent mixed liquid did not include any FEC. In the electric storage device according to Trial No. 22, a compositional ratio between the respective components (or solid contents) within the negative-electrode material was as follows: $SiO_x$:Graphite:AB: PAI=32:50:8:10 by mass. The electric storage device according to Trial No. 22 was a device that had been manufactured by the same method as that of Trial No. 1.

Charging-Discharging Test

A charging-discharging test was carried out for the electric storage devices according to Trial No. 21 and Trial No. 22 in the same manner as aforementioned, thereby measuring the discharge-capacity maintenance rates of the electric storage devices at the time when 500 cycles had elapsed. Those results are shown in Table 3.

TABLE 3

|  | Note (Electrolytic Solution) | Capacity Maintenance Rate (%) |
| --- | --- | --- |
| Trial No. 21 | With FEC | 91.000 |
| Trial No. 22 | Without FEC | 73.4386 |

As shown in Table 3, the capacity maintenance rate at the time of 500-cycle elapse upgraded greatly in the case where the electrolytic solution including FEC was used, compared with the other case where the electrolytic solution free from FEC was used. From this result, it was understood that it is possible to further upgrade the resulting cyclability when a solution including FEC is used for an electric storage device according to the present invention as the electrolytic solution.

Trial No. 23

Other than the composition of the positive-electrode active material and "the content of the $SiO_x$," an electric storage device according to Trial No. 23 was the same device as the electric storage device according to Trial No. 1. To be concrete, $Li_1(Co_{2/10}Ni_{5/10}Mn_{3/10})O_2$ was used, as for the positive-electrode active material. In the electric storage device according to Trial No. 23, a compositional ratio between the respective components (or solid contents) within the negative-electrode material was as follows: $SiO_x$: Graphite:AB:PAI=32:50:8:10 by mass. The electric storage device according to Trial No. 23 was a device that had been manufactured by the same method as that of Trial No. 1.

Trial No. 24

Other than "the content of the $SiO_x$," an electric storage device according to Trial No. 24 was the same device as the electric storage device according to Trial No. 1. In other words, in Trial No. 24, $Li_1(Co_{1/3}Ni_{1/3}Mn_{1/3})O_2$ was used as the positive-electrode active material. In the electric storage device according to Trial No. 24, a compositional ratio between the respective components (or solid contents) within the negative-electrode material was as follows: $SiO_x$: Graphite:AB:PAI=32:50:8:10 by mass. The electric storage device according to Trial No. 24 was a device that had been manufactured by the same method as that of Trial No. 1.

Energy Density

Laminated cells were fabricated using the electric storage devices according to Trial No. 23 and Trial No. 24, and were then measured for their energy densities (Wh/L), respectively. Those results are shown in Table 4.

TABLE 4

|  | Note (Positive-electrode Active Material) | Energy Density (Wh/L) |
| --- | --- | --- |
| Trial No. 23 | $Li_1(Co_{2/10}Ni_{5/10}Mn_{3/10})O_2$ | 495.225 |
| Trial No. 24 | $Li_1(Co_{1/3}Ni_{1/3}Mn_{1/3})O_2$ | 465.000 |

As shown in Table 4, it was possible to greatly upgrade the energy density in the laminated cell in the case where $Li_1(Co_{2/10}Ni_{5/10}Mn_{3/10})O_2$ was used as the positive-electrode active material, compared with the other case where $Li_1(Co_{1/3}Ni_{1/3}Mn_{1/3})O_2$ was used therefor. In other words, it is possible to make the capacity of an electric storage device according to the present invention augmentable when $Li_1(Co_{2/10}Ni_{5/10}Mn_{3/10})O_2$ was used as the positive-electrode active material of the electric storage device according to the present invention.

Trial No. 25

Other than the graphite whose "$D_{50}$" was 20 μm and "the content of the $SiO_x$," a negative-electrode material according to Trial No. 25 was the same material as the negative-electrode material according to Trial No. 1. In the negative-electrode material according to Trial No. 25, a compositional ratio between the respective components (or solid contents) within the negative-electrode material was as follows: $SiO_x$: Graphite:AB:PAI=32:50:8:10 by mass. A negative electrode and electric storage device according to Trial No. 25 were those which had been manufactured with the distinct negative-electrode material according to Trial No. 25 but by the same method as that of Trial No. 1.

Trial No. 26

Other than the graphite whose "$D_{50}$" was 12 μm and "the content of the $SiO_x$," a negative-electrode material according to Trial No. 26 was the same material as the negative-electrode material according to Trial No. 1. In the negative-electrode material according to Trial No. 26, a compositional ratio between the respective components (or solid contents) within the negative-electrode material was as follows: $SiO_x$: Graphite:AB:PAI=32:50:8:10 by mass. A negative electrode and electric storage device according to Trial No. 26 were those which had been manufactured with the distinct negative-electrode material according to Trial No. 26 but by the same method as that of Trial No. 1.

Charging-Discharging Test

A charging-discharging test was carried out for the electric storage devices according to Trial No. 25 and Trial No. 26 in the same manner as aforementioned, thereby measuring the discharge-capacity maintenance rates of the electric storage devices at the time when 900 cycles had elapsed. Those results are shown in Table 5.

TABLE 5

| | Note ("$D_{50}$") (μm) of Graphite | Capacity Maintenance Rate (%) |
|---|---|---|
| Trial No. 25 | 20 | 0.865990 |
| Trial No. 26 | 12 | 0.883663 |

As shown in Table 5, the electric storage device according to Trial No. 25 comprising the graphite whose "$D_{50}$" was 20 μm exhibited the smaller capacity maintenance at the time when 900 cycles had elapsed, compared with that the electric storage device according to Trial No. 26 comprising the graphite whose "$D_{50}$" was 12 μm exhibited. Therefore, it is understood that it is preferable to use the graphite whose "$D_{50}$" is smaller as a negative-electrode material according to the present invention; and that using graphite whose "$D_{50}$" is 12 μm as the claimed graphite makes it possible to give the excellent cyclability to an electric storage device according to the present invention.

Trial No. 27

Other than "the content of the $SiO_x$," a negative-electrode material according to Trial No. 27 was the same material as the negative-electrode material according to Trial No. 1. In the negative-electrode material according to Trial No. 27, a compositional ratio between the respective components (or solid contents) within the negative-electrode material was as follows: $SiO_x$:Graphite:AB:PAI=12:70:8:10 by mass. A negative electrode and electric storage device according to Trial No. 27 were those which had been manufactured with the distinct negative-electrode material according to Trial No. 27 but by the same method as that of Trial No. 1.

Trial No. 28

Other than "the content of the $SiO_x$," a negative-electrode material according to Trial No. 28 was the same material as the negative-electrode material according to Trial No. 1. In the negative-electrode material according to Trial No. 28, a compositional ratio between the respective components (or solid contents) within the negative-electrode material was as follows: $SiO_x$:Graphite:AB:PAI=17:65:8:10 by mass. A negative electrode and electric storage device according to Trial No. 28 were those which had been manufactured with the distinct negative-electrode material according to Trial No. 27 but by the same method as that of Trial No. 1.

Trial No. 29

Other than "the content of the $SiO_x$," a negative-electrode material according to Trial No. 29 was the same material as the negative-electrode material according to Trial No. 1. In the negative-electrode material according to Trial No. 29, a compositional ratio between the respective components (or solid contents) within the negative-electrode material was as follows: $SiO_x$:Graphite:AB:PAI=18.88:63.12:8:10 by mass. A negative electrode and electric storage device according to Trial No. 29 were those which had been manufactured with the distinct negative-electrode material according to Trial No. 29 but by the same method as that of Trial No. 1.

Trial No. 30

Other than "the content of the $SiO_x$," a negative-electrode material according to Trial No. 30 was the same material as the negative-electrode material according to Trial No. 1. In the negative-electrode material according to Trial No. 30, a compositional ratio between the respective components (or solid contents) within the negative-electrode material was as follows: $SiO_x$:Graphite:AB:PAI=24:58:8:10 by mass. A negative electrode and electric storage device according to Trial No. 30 were those which had been manufactured with the distinct negative-electrode material according to Trial No. 30 but by the same method as that of Trial No. 1.

Trial No. 31

Other than "the content of the $SiO_x$," a negative-electrode material according to Trial No. 31 was the same material as the negative-electrode material according to Trial No. 1. In the negative-electrode material according to Trial No. 31, a compositional ratio between the respective components (or solid contents) within the negative-electrode material was as follows: $SiO_x$:Graphite:AB:PAI=32:50:8:10 by mass. A negative electrode and electric storage device according to Trial No. 31 were those which had been manufactured with the distinct negative-electrode material according to Trial No. 31 but by the same method as that of Trial No. 1.

Charging-Discharging Test

A charging-discharging test was carried out for the electric storage devices according to Trial No. 27 through Trial No. 31 in the same manner as aforementioned, thereby measuring the discharge-capacity maintenance rates of the electric storage devices at the time when 1500 cycles had elapsed. Those results are shown in Table 6.

TABLE 6

| | $SiO_x$ (% by mass) | SMG (i.e., Graphite) (% by mass) | AB (% by mass) | PAI (% by mass) | Capacity Maintenance Rate (%) |
|---|---|---|---|---|---|
| Trial No. 27 | 12 | 70 | 8 | 10 | 84.11692 |
| Trial No. 28 | 17 | 65 | 8 | 10 | 83.00000 |
| Trial No. 29 | 18.88 | 63.12 | 8 | 10 | 82.45000 |
| Trial No. 30 | 24 | 58 | 8 | 10 | 77.28000 |
| Trial No. 31 | 32 | 50 | 8 | 10 | 74.59941 |

As shown in Table 6, the less "the content of the $SiO_x$" was the higher the capacity maintenance rate of the resulting electric storage device became at the time when 1,500 cycles had elapsed. The capacity maintenance rates of the electric storage devices according to Trial Nos. 27 through 29 were fully high. Consequently, taking the resultant cyclability into consideration, it is understood that it is preferable to use a material whose $SiO_x$ content is less than 24% by mass as the present negative-electrode material for electric storage device. Seeking between 24% by mass and 18.88% to adopt a certain threshold value, it is understood that the content can be 20% by mass or less. A more preferable content of the $SiO_x$ can be 19% by mass or less, and a much more preferable content of the $SiO_x$ can be 17% by mass or less.

Trial No. 32

Other than the $SiO_x$ whose "$D_{50}$" was 1.37 μm, and "the content of the $SiO_x$," a negative-electrode material according to Trial No. 32 was the same material as the negative-electrode material according to Trial No. 1. To be concrete, some of the SiO$_x$ (or a fine powder thereof), which had been classified with a sieve and had passed through the one-micrometer sieve openings in the same manner as Trial No. 16, was used, as for the SiO$_x$. In the negative-electrode active material according to Trial No. 32, a compositional ratio between the respective components (or solid contents) within the negative-electrode material was as follows: SiO$_x$:Graphite:AB:PAI=32:50:8:10 by mass. Note that, in Trial No. 32, the "D$_{50}$" of the graphite was 20 μm.

Trial No. 33

Other than the SiO$_x$ whose "D$_{50}$" was 4.37 μm, and "the content of the SiO$_x$," a negative-electrode material according to Trial No. 33 was the same material as the negative-electrode material according to Trial No. 1. To be concrete, the same SiO$_x$, which was identical with that of Trial No. 1, was used as it was (i.e., without cutting) in the same manner as Trial No. 17, as for the SiO$_x$. In the negative-electrode material according to Trial No. 33, a compositional ratio between the respective components (or solid contents) within the negative-electrode material was as follows: SiO$_x$:Graphite:AB:PAI=32:50:8:10 by mass. Note that, in Trial No. 33, the "D$_{50}$" of the graphite was 20 μm.

Trial No. 34

Other than the SiO$_x$ whose "D$_{50}$" was 5.71 μm, and "the content of the SiO$_x$," a negative-electrode material according to Trial No. 34 was the same material as the negative-electrode material according to Trial No. 1. To be concrete, some of the SiO$_x$, which had been classified with a sieve but had not passed through the one-micrometer sieve openings (i.e., one-micrometer cutting) in the same manner as Trial No. 18, was used, as for the SiO$_x$. In the negative-electrode material according to Trial No. 34, a compositional ratio between the respective components (or solid contents) within the negative-electrode material was as follows: SiO$_x$:Graphite:AB:PAI=32:50:8:10 by mass. Note that, in Trial No. 34, the "D$_{50}$" of the graphite was 20 μm.

Trial No. 35

Other than the SiO$_x$ whose "D$_{50}$" was 6.36 μm, and "the content of the SiO$_x$," a negative-electrode material according to Trial No. 35 was the same material as the negative-electrode material according to Trial No. 1. To be concrete, some of the SiO$_x$, which had been classified with a sieve but had not passed through the two-micrometer sieve openings (i.e., two-micrometer cutting) in the same manner as Trial No. 19, was used, as for the SiO$_x$. In the negative-electrode material according to Trial No. 35, a compositional ratio between the respective components (or solid contents) within the negative-electrode material was as follows: SiO$_x$:Graphite:AB:PAI=32:50:8:10 by mass. Note that, in Trial No. 35, the "D$_{50}$" of the graphite was 20 μm.

Trial No. 36

Other than the SiO$_x$ whose "D$_{50}$" was 7.21 μm, and "the content of the SiO$_x$," a negative-electrode material according to Trial No. 36 was the same material as the negative-electrode material according to Trial No. 1. To be concrete, some of the SiO$_x$, which had been classified with a sieve but had not passed through the four-micrometer sieve openings (i.e., four-micrometer cutting) in the same manner as Trial No. 20, was used, as for the SiO$_x$. In the negative-electrode material according to Trial No. 36, a compositional ratio between the respective components (or solid contents) within the negative-electrode material was as follows: SiO$_x$:Graphite:AB:PAI=32:50:8:10 by mass. Note that, in Trial No. 36, the "D$_{50}$" of the graphite was 20 μm.

Charging-Discharging Test

Charging and discharging operations were carried out repetitively for the electric storage devices according to Trial Nos. 32 through 36 in the same manner as aforementioned, thereby measuring the discharge-capacity maintenance rates of the electric storage devices at the time when 500 cycles had elapsed. Those results are shown in Table 7.

TABLE 7

| | Note (Treatment to SiO$_x$) | BET | D$_{10}$ (μm) | D$_{50}$ (μm) | D$_{90}$ (μm) | Capacity Maintenance Rate (%) |
|---|---|---|---|---|---|---|
| Trial No. 32 | Fine Powder | 16.299 | 0.47 | 1.37 | 5.355 | 72.59 |
| Trial No. 33 | Without Cutting | 6.5574 | 1.391 | 4.374 | 7.986 | 77.25 |
| Trial No. 34 | 1-μm Cutting | 3.3479 | 3.414 | 5.713 | 8.817 | 89.59 |
| Trial No. 35 | 2-μm Cutting | 2.8029 | 4.401 | 6.357 | 9.196 | 89.18 |
| Trial No. 36 | 4-μm Cutting | 2.6452 | 5.358 | 7.211 | 9.981 | 90.83 |

As shown in Table 7, as the particle diameter of the SiO$_x$ became larger, the capacity maintenance rate (%) became larger when 500 cycles had elapsed in the case where the "D$_{50}$" of the graphite was 20 μm as well. To be concrete, the larger the "D$_{50}$" of the SiO$_x$ the more preferable it is; for example, the "D$_{50}$" can be 5.7 μm or more; it is more preferable that the "D$_{50}$" can be 6.3 μm or more; and it is much more preferable that the "D$_{50}$" can be from 5.7 μm to 7.8 μm. Note that the "D$_{50}$" of the graphite was 20 μm in Trial Nos. 32 through 36. Since an especially preferable "D$_{50}$" of the SiO$_x$ can be from 5.7 μm to 7.8 μm approximately, it is possible to say that the "D$_{50}$" of the SiO$_x$ can preferably exceed ¼ of the graphite's "D$_{50}$"; can more preferably exceed ⅓ of the graphite's "D$_{50}$"; and can much more preferably exceed ⅖ of the graphite's "D$_{50}$."

Note that an electric storage device according to the present invention is suitable for batteries for vehicle.

The invention claimed is:
1. A negative-electrode material for electric storage device, comprising:
   a negative-electrode active material including a silicon oxide, which is expressed by SiO$_x$, where 0.3≤"x"≤1.6, and graphite;
   a conductive additive containing carbonaceous fine particles; and
   a binder resin;
   wherein the conductive additive is acetylene black;
   wherein a volume average particle diameter "D$_{50}$" of said SiO$_x$ is from 5.7 μm or more to 7.8 μm or less; and
   wherein, when a sum of the contents of the negative-electrode active material, the conductive additive and the binder resin is taken as 100% by mass:
   a content of the negative-electrode active material is 70% 80% by mass or more;

a content of said $SiO_x$ is from 22% by mass or more to 40% by mass or less;

a sum of a content of the conductive additive and a content of the binder resin is from 8% by mass or more to 20% by mass or less; and a content of the conductive additive is from 6% by mass or more to 12% by mass or less.

2. The negative-electrode material for electric storage device as set forth in claim 1, wherein a volume average particle diameter "$D_{50}$" of said $SiO_x$ exceeds 2/5 of a particle diameter "$D_{50}$" of said graphite.

3. The negative-electrode material for electric storage device as set forth in claim 1, wherein, when a sum of the contents of the negative-electrode active material, the conductive additive and the binder resin is taken as 100% by mass, the content of said $SiO_x$ is from 25% by mass or more to 40% by mass or less.

4. A negative electrode for electric storage device being characterized in that the negative electrode comprises the negative-electrode material for electric storage device as set forth in claim 1 that serves as one of the materials.

5. An electric storage device being characterized in that the electric storage device comprises:

the negative electrode for electric storage device as set forth in claim 4; and an electrolytic solution including fluoroethylene carbonate.

6. The electric storage device as set forth in claim 5, wherein the electric storage device is a secondary battery.

7. The electric storage device as set forth in claim 6, comprising a positive-electrode active material that serves as one of the positive electrodes, the positive-electrode active material including a composite metallic oxide that is expressed by a formula: $LiCo_pNi_qMn_rO_2$, where "p"+"q"+"r"=1; 0<"p"<1; 0≤"q"<1; and 0≤"r"<1.

8. The electric storage device as set forth in claim 7, wherein said composite metallic oxide is $LiCo_{2/10}Ni_{5/10}Mn_{3/10}O_2$.

9. A vehicle being characterized in that the vehicle comprises the electric storage device as set forth in claim 6.

10. The negative-electrode material for electric storage device as set forth in claim 1, wherein, when a sum of the contents of the negative-electrode active material, the conductive additive and the binder resin is taken as 100% by mass, the content of acetylene black is from 8% by mass or more to 10% by mass or less.

11. The negative-electrode material for electric storage device as set forth in claim 1, wherein, when a sum of the contents of the negative-electrode active material, the conductive additive and the binder resin is taken as 100% by mass, a content of said $SiO_x$ is from 22% by mass or more to 35% by mass or less.

12. The negative-electrode material for electric storage device as set forth in claim 1, wherein, when a sum of the contents of the negative-electrode active material, the conductive additive and the binder resin is taken as 100% by mass, a content of said $SiO_x$ is from 27% by mass or more to 32% by mass or less.

13. The negative-electrode material for electric storage device as set forth in claim 1, wherein, when a sum of the contents of the negative-electrode active material, the conductive additive and the binder resin is taken as 100% by mass, a content of said $SiO_x$ is from 32% by mass or more to 40% by mass or less.

14. The negative-electrode material for electric storage device as set forth in claim 1, wherein, when a sum of the contents of the negative-electrode active material, the conductive additive and the binder resin is taken as 100% by mass:

the conductive additive and the binder resin is taken as 100% by mass, a content of said $SiO_x$ is from 27% by mass or more to 32% by mass or less; and the content of acetylene black is from 8% by mass or more to 10% by mass or less.

15. The negative-electrode material for electric storage device as set forth in claim 1, wherein, when a sum of the contents of the negative-electrode active material, the conductive additive and the binder resin is taken as 100% by mass:

the conductive additive and the binder resin is taken as 100% by mass, a content of said $SiO_x$ is from 32% by mass or more to 40% by mass or less; and the content of acetylene black is from 8% by mass or more to 10% by mass or less.

16. The negative-electrode material for electric storage device as set forth in claim 1, wherein a volume average particle diameter "$D_{50}$" of said SiOx is from 5.7 μm or more to 7.2 μm or less.

17. The negative-electrode material for electric storage device as set forth in claim 15, wherein a volume average particle diameter "$D_{50}$" of said SiOx is from 5.7 μm or more to 7.2 μm or less.

18. The negative-electrode material for electric storage device as set forth in claim 16, wherein a volume average particle diameter "$D_{50}$" of said SiOx is from 5.7 μm or more to 7.2 μm or less.

19. The negative-electrode material for electric storage device as set forth in claim 1, wherein, when a sum of the contents of the negative-electrode active material, the conductive additive and the binder resin is taken as 100% by mass, the content of said $SiO_x$ is from 25% by mass or more to 32% by mass or less.

* * * * *

UNITED STATES PATENT AND TRADEMARK OFFICE
CERTIFICATE OF CORRECTION

PATENT NO. : 9,774,039 B2
APPLICATION NO. : 14/351605
DATED : September 26, 2017
INVENTOR(S) : Megumi Yamamoto, Manabu Miyoshi and Hideaki Shinoda It is certified that error appears in the above-identified patent and that said Letters Patent is hereby corrected as shown below:

In the Claims

Column 28, Lines 66-67:
Delete "a content of the negative-electrode active material is 70% 80% by mass or more;"
Insert --a content of the negative-electrode active material is 80% by mass or more;--

Signed and Sealed this
Twenty-seventh Day of March, 2018

Andrei Iancu
*Director of the United States Patent and Trademark Office*